US009479653B2

(12) United States Patent
Yin et al.

(10) Patent No.: US 9,479,653 B2
(45) Date of Patent: Oct. 25, 2016

(54) DEPLOYING A TOLL-FREE DATA SERVICE CAMPAIGN

(71) Applicant: Verizon Patent and Licensing Inc., Arlington, VA (US)

(72) Inventors: Fenglin Yin, Lexington, MA (US); Susan Kelly, Maynard, MA (US); Ajit Nair, Newton, MA (US); Jae Won Chung, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 169 days.

(21) Appl. No.: 14/276,185

(22) Filed: May 13, 2014

(65) Prior Publication Data

US 2015/0334248 A1 Nov. 19, 2015

(51) Int. Cl.
*H04W 24/00* (2009.01)
*H04M 15/00* (2006.01)
*G06Q 30/02* (2012.01)

(52) U.S. Cl.
CPC ......... *H04M 15/8033* (2013.01); *H04M 15/09* (2013.01); *H04M 15/68* (2013.01); *G06Q 30/02* (2013.01)

(58) Field of Classification Search
CPC .................... H04M 2215/0192; H04M 15/08; H04M 15/68; G06Q 20/123; G06Q 20/14; H04W 4/00–4/003; H04W 4/02; H04W 4/06–4/206
See application file for complete search history.

(56) References Cited

U.S. PATENT DOCUMENTS

| | | | | |
|---|---|---|---|---|
| 2005/0131944 A1* | 6/2005 | Patrick | ............. | G06F 17/30867 |
| 2008/0214204 A1* | 9/2008 | Ramer | ..................... | G01C 3/24 |
| | | | | 455/456.1 |
| 2009/0037254 A1* | 2/2009 | Colando | ................ | G06Q 30/02 |
| | | | | 705/7.32 |
| 2009/0112687 A1* | 4/2009 | Blair | ..................... | G06Q 30/02 |
| | | | | 705/7.29 |
| 2012/0155380 A1* | 6/2012 | Hodges | .................. | G06Q 30/00 |
| | | | | 370/328 |
| 2012/0209753 A1* | 8/2012 | Hodges | ................. | H04L 12/146 |
| | | | | 705/30 |
| 2012/0278229 A1* | 11/2012 | Vishwanathan | ..... | G06Q 20/123 |
| | | | | 705/40 |
| 2013/0339135 A1* | 12/2013 | Drozd | ................ | G06Q 30/0268 |
| | | | | 705/14.45 |
| 2014/0018035 A1* | 1/2014 | Albisu | ................ | H04L 12/1403 |
| | | | | 455/406 |
| 2014/0280758 A1* | 9/2014 | Sharma | ................. | H04W 4/021 |
| | | | | 709/219 |

* cited by examiner

*Primary Examiner* — San Htun

(57) ABSTRACT

A device may receive campaign information for deploying a toll-free data service campaign. The campaign information may identify a geographic region in which the toll-free data service campaign is to be deployed. The device may mark the toll-free data service campaign as ready to deploy, and may generate campaign rules based on the campaign information. The campaign rules may identify conditions for charging a content provider, associated with the toll-free data service campaign, for data used by a mobile device in association with the toll-free data service campaign. The device may deploy the toll-free data service campaign by providing the campaign rules to enforcement devices associated with the geographic region. The device may mark the toll-free data service campaign as being deployed. The device may determine that deployment of the toll-free data service campaign has been completed, and may mark the toll-free data service campaign as deployed.

20 Claims, 22 Drawing Sheets

DEPLOYING A TOLL-FREE DATA SERVICE CAMPAIGN

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a service provider that provides the toll-free data service, rather than to an end user that uses the toll-free data service.

DETAILED DESCRIPTION OF PREFERRED EMBODIMENTS

The following detailed description of example implementations refers to the accompanying drawings. The same reference numbers in different drawings may identify the same or similar elements.

A toll-free data service may refer to a service where a network operator charges data usage (e.g., byte usage) to a service provider (e.g., a content provider) that provides the toll-free data service, rather than to an end user that uses a mobile device to access the toll-free data service. Unlike toll-free telephone numbers that may take days to deploy, toll-free data services may be deployed in near real-time. For example, a content provider may set up a toll-free data service campaign that describes parameters of a toll-free data service, and a network operator may use the parameters to deploy the toll-free data service campaign. However, managing deployment of toll-free data services efficiently and effectively may be difficult. Implementations described herein describe architectures and operations for efficient and effective deployment of toll-free data service campaigns.

Figure 1:
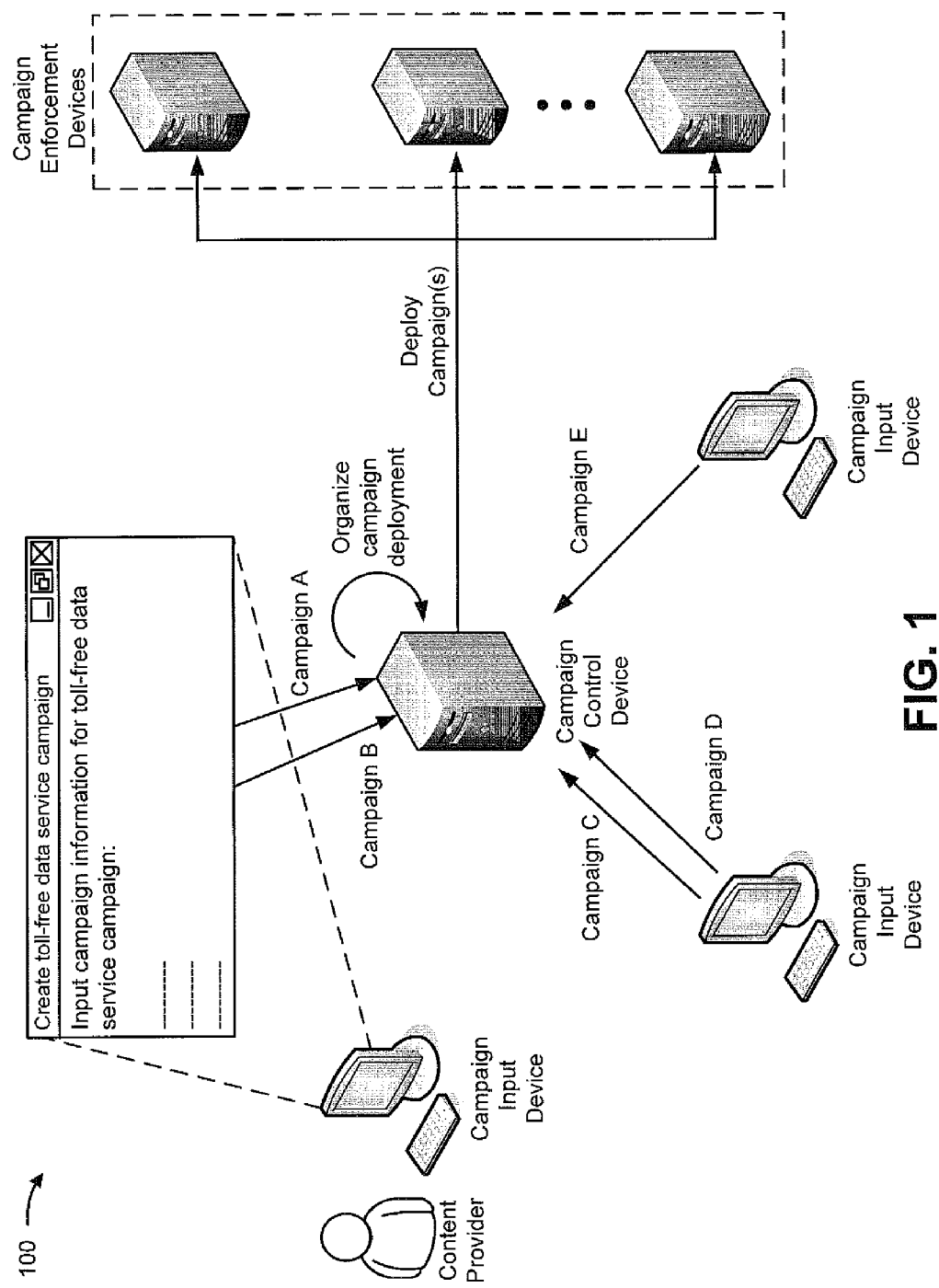
FIG. 1 is a diagram of an overview of an example implementation described herein.

FIG. 1 is a diagram of an overview of an example implementation 100 described herein. As shown in FIG. 1, a content provider may interact with a campaign input device to provide campaign information that describes parameters for deploying a toll-free data service campaign. As shown, the content provider may provide multiple campaigns. A particular campaign may update a previous campaign, may conflict with another campaign, etc., making deployment of the campaigns difficult.

As further shown in FIG. 1, a campaign control device may receive campaign information for the multiple campaigns, and may organize deployment of the campaigns. For example, the campaign control device may organize deployment of the campaigns such that conflicts between campaigns are resolved, new campaigns replace old campaigns, and the campaigns are periodically or continuously deployed as the campaigns are received by the campaign control device. The campaign control device may deploy a campaign to multiple campaign enforcement devices, which may be located in different geographic regions, to ensure that the campaign is deployed according to parameters input by the content providers. In this way, a network operator can ensure that toll-free data service campaigns are deployed efficiently in a manner desired by a content provider.

Figure 2:
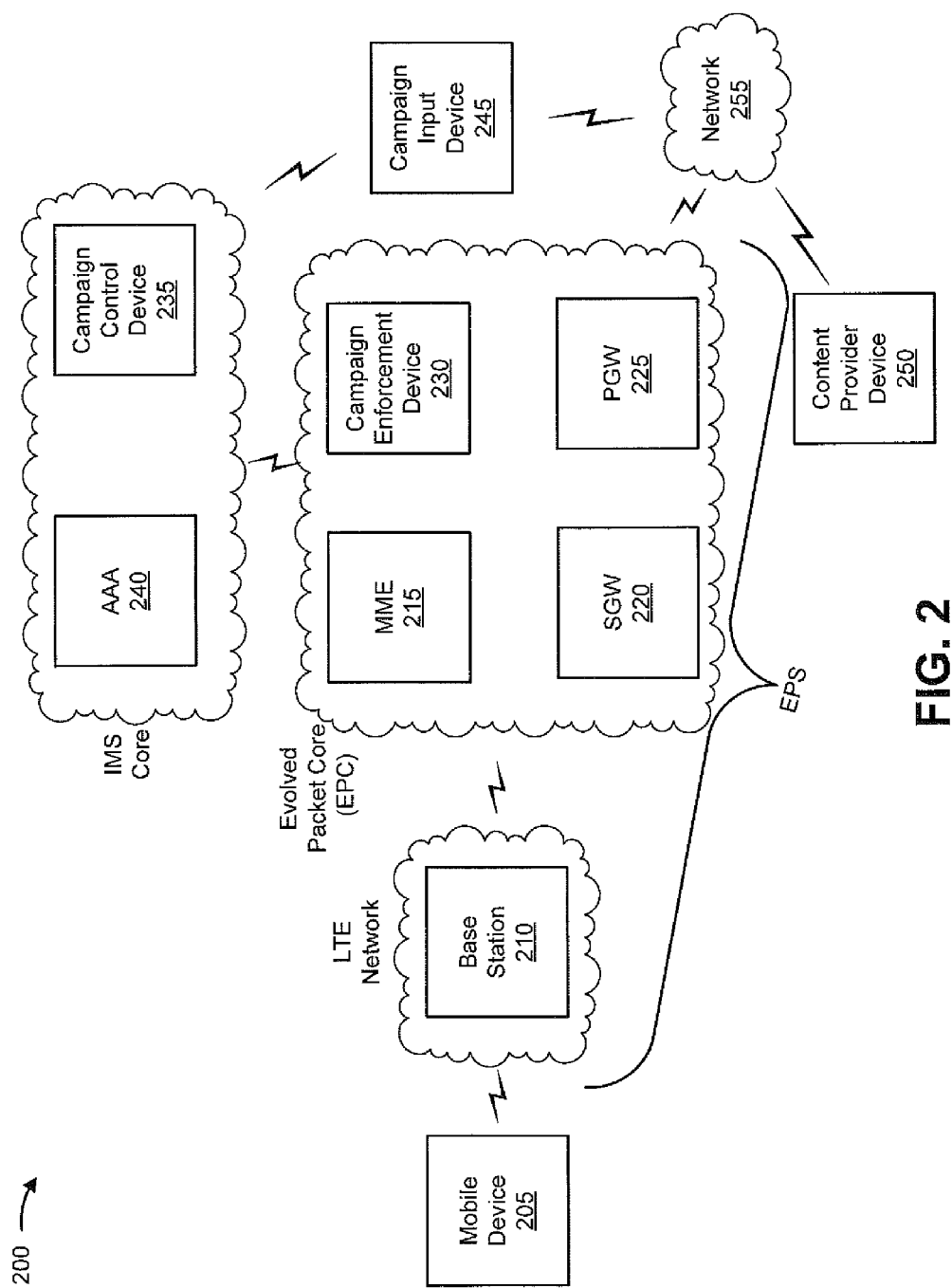
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a campaign enforcement device 230; a campaign control device 235; an authentication, authorization, and accounting server (AAA) 240; a campaign input device 245; a content provider device 250; and a network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, PGW 225, and/or campaign enforcement device 230 that enable mobile devices 205 to communicate with network 255 and/or an Internet protocol (IP) multimedia subsystem (IMS) core. The IMS core may include campaign control device 235 and/or AAA 240, and may manage device registration and authentication, session initiation, campaign information, etc., associated with mobile devices 205 and/or content provider devices 250. Campaign control device 235 and/or AAA 240 may reside in the EPC and/or the IMS core.

Mobile device 205 may include one or more devices capable of communicating with base station 210 and/or a network (e.g., network 255). For example, mobile device 205 may include a wireless communication device, a radiotelephone, a personal communications system (PCS) terminal (e.g., that may combine a cellular radiotelephone with data processing and data communications capabilities), a personal digital assistant (PDA), a smart phone, a laptop computer, a tablet computer, a personal gaming system, and/or a similar device. Mobile device 205 may send traffic to and/or receive traffic from network 255 (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 255 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more servers, capable of managing authentication, activation, deactivation, and mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 255 (e.g., via PGW 225) and/or other network devices associated with the EPC and/or the IMS core. SGW 220 may also receive traffic from network 255 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 255. Additionally, or alternatively, PGW 225 may receive traffic from network 255, and may send the traffic to mobile device 205 via SGW 220 and base station 210. PGW 225 may record data usage information (e.g., byte usage), and may provide the data usage information to AAA 240.

Campaign enforcement device 230 may include one or more devices capable of inspecting traffic and applying one or more campaign rules to the traffic. For example, campaign enforcement device 230 may include a gateway, a router, a modem, a switch, a firewall, a NIC, a hub, a bridge, a server, an OADM, or a similar device. Campaign enforcement device 230 may receive campaign rules from campaign control device 235, may apply the campaign rules to traffic received from PGW 225, and may instruct PGW 225 how to handle the traffic based on the campaign rules. Additionally, or alternatively, campaign enforcement device 230 may instruct AAA 240 how to charge for data usage associated with the traffic. Different campaign enforcement devices 230 may be associated with different geographic regions and/or cellular service areas, in some implementations.

Campaign control device 235 may include one or more devices capable of receiving, generating, storing, processing, and/or providing information associated with a toll-free data service campaign (e.g., campaign information, campaign rules, etc.). For example, campaign control device 235 may include a server device or a similar device. Campaign control device 235 may receive campaign information from campaign input device 245, may generate campaign rules based on the campaign information, and may deploy the campaign rules to one or more campaign enforcement devices 230 (e.g., associated with one or more cellular service areas).

AAA 240 may include one or more devices, such as one or more server devices, that perform authentication, authorization, and/or accounting operations for communication sessions associated with mobile device 205. For example, AAA 240 may store data usage information for mobile device 205, for a user associated with mobile device 205, for content provider device 250, for a content provider (e.g., that provides a toll-free data service), etc.

Campaign input device 245 may include one or more devices capable of receiving, generating, storing, processing, and/or providing information associated with a toll-free data service campaign. For example, campaign input device 245 may include a desktop computer, a laptop computer, a mobile phone, a server device, or a similar device. Campaign input device 245 may receive input, from a content provider, that identifies campaign information, and may provide the campaign information to campaign control device 235.

Content provider device 250 may include one or more devices capable of providing content (e.g., to mobile device 205). For example, content provider device 250 may include a server device (e.g., a host server, a web server, an application server, etc.) or a similar device. Content provider device 250 may be associated with a content provider that provides a toll-free data service, where the content provider is charged for data usage rather than an end user associated with mobile device 205.

Network 255 may include one or more wired and/or wireless networks. For example, network 255 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
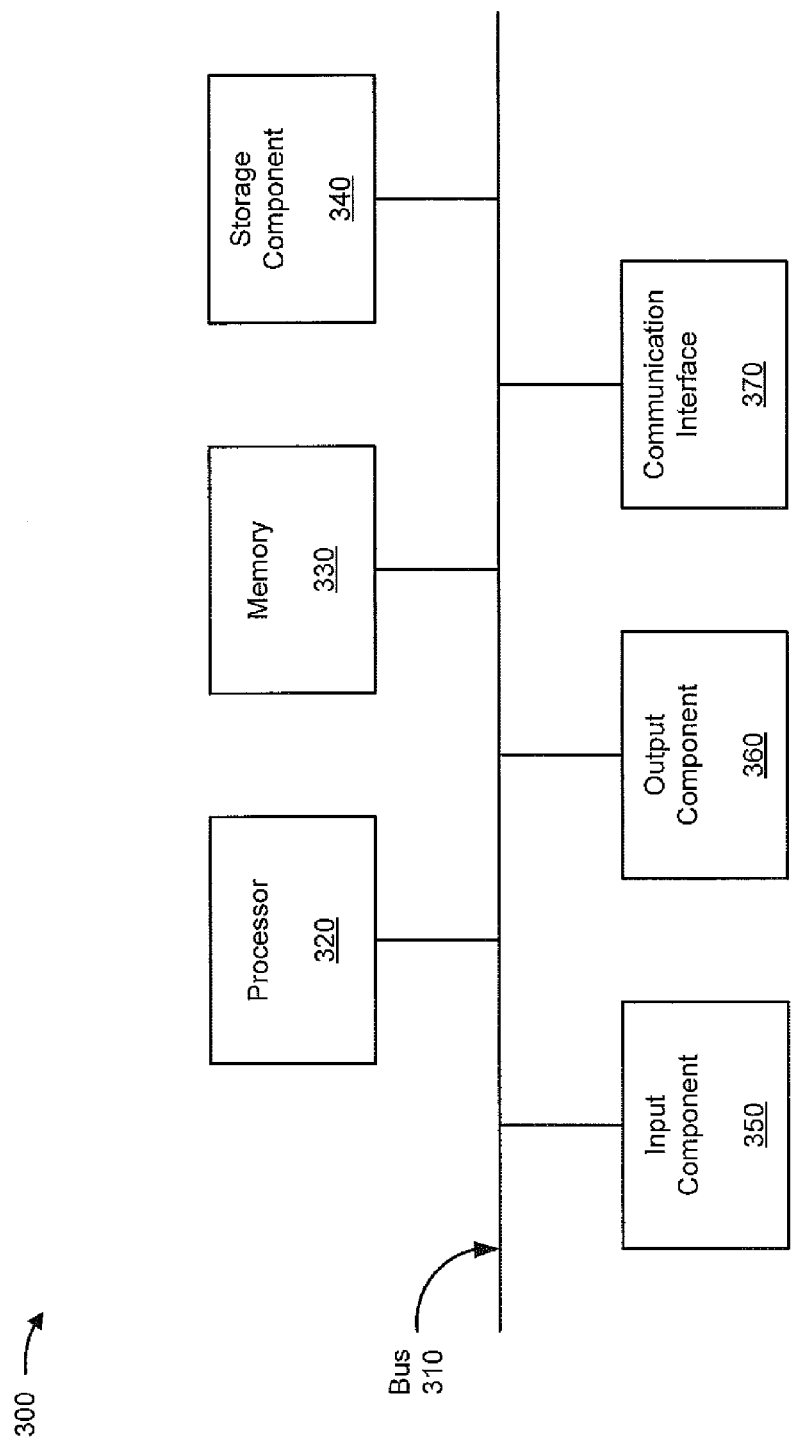
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, campaign enforcement device 230, campaign control device 235, AAA 240, campaign input device 245, and/or content provider device 250. In some implementations, mobile device 205, base station 210, MME 215, SGW 220, PGW 225, campaign enforcement device 230, campaign control device 235, AAA 240, campaign input device 245, and/or content provider device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
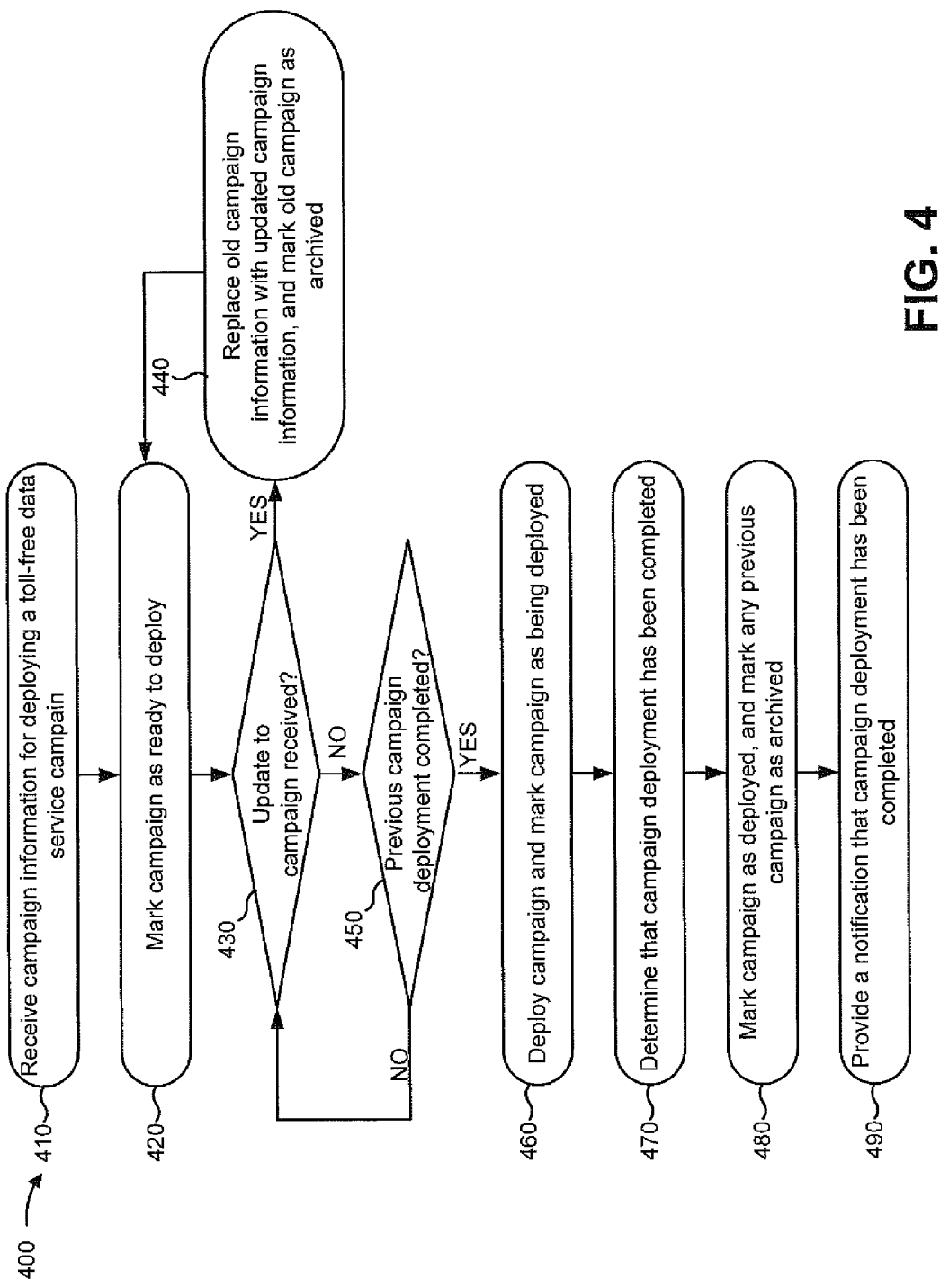
FIG. 4 is a flow chart of an example process for deploying a toll-free data service campaign.

FIG. 4 is a flow chart of an example process 400 for deploying a toll-free data service campaign. In some implementations, one or more process blocks of FIG. 4 may be performed by campaign control device 235. In some implementations, one or more process blocks of FIG. 4 may be performed by another device or a group of devices separate from or including campaign control device 235, such as mobile device 205, base station 210, MME 215, SGW 220, PGW 225, campaign enforcement device 230, AAA 240, campaign input device 245, and/or content provider device 250.

As shown in FIG. 4, process 400 may include receiving campaign information for deploying a toll-free data service campaign (block 410). For example, campaign control device 235 may receive campaign information for deploying a toll-free data service campaign. A toll-free data service campaign (sometimes referred to herein as a campaign) may refer to a campaign by a content provider where the content provider agrees to be charged for data usage by users of mobile devices 205 that access content provided by the content provider (e.g., rather than the users being charged for the data usage).

Campaign information may include, for example, information that identifies a content provider associated with a campaign, information that identifies one or more content provider devices 250 that provide content associated with a campaign, information that identifies a geographic region associated with a campaign, information that identifies a time period during which a campaign is valid, information that identifies an amount of data (e.g., in bytes) that the content provider will pay for during the campaign (e.g., a maximum amount of data), information that identifies a uniform resource locator (URL) via which a toll-free data service can be accessed for the campaign, etc. In some implementations, an employee associated with the content provider may input campaign information using campaign input device 245, and campaign input device 245 may provide the campaign information to campaign control device 235.

As further shown in FIG. 4, process 400 may include marking the campaign as ready to deploy (block 420). For example, campaign control device 235 may receive campaign information for a campaign, and may mark the campaign as ready to deploy. In some implementations, campaign control device 235 may mark a campaign as ready to deploy by linking information that identifies the campaign (e.g., a campaign identifier) and a ready to deploy indicator that indicates that the campaign is ready to deploy. For example, campaign control device 235 may store (e.g., using a data structure) a relationship between a campaign identifier and a ready to deploy indicator. Campaign control device 235 may periodically deploy campaigns marked as ready to deploy. Campaign control device 235 may mark a campaign with another status, described elsewhere herein (e.g., being deployed, deployed, archived, failed, paused, etc.), in a similar manner.

As further shown in FIG. 4, process 400 may include determining whether an update to the campaign has been received before deployment of the campaign has begun (block 430). For example, campaign control device 235 may determine whether an update to the campaign has been received before deployment of the campaign has begun. In some implementations, a content provider may wish to update a campaign before deployment of the campaign has begun. For example, the content provider may interact with campaign input device 245 to provide updated campaign information to campaign control device 235.

As further shown in FIG. 4, if an update to the campaign is received before deployment has begun (block 430—YES), then process 400 may include replacing old campaign information with updated campaign information, and marking the old campaign as archived (block 440), and returning to block 420. For example, if campaign control device 235 receives an update to a campaign before campaign control device 235 has begun deployment of the campaign, then campaign control device 235 may update the campaign information. For example, campaign control device 235 may replace old campaign information (e.g., received before the updated campaign information) with updated campaign information (e.g., received after the old campaign information) for the campaign.

Additionally, or alternatively, campaign control device 235 may mark an old campaign (e.g., associated with old campaign information) as archived. Campaign control device 235 may prevent archived campaigns from being deployed, in some implementations. Additionally, or alternatively, campaign control device 235 may permit a content provider to view archived campaigns (e.g., using campaign input device 245), and may permit a content provider to reinstate an archived campaign (e.g., causing campaign control device 235 to deploy the campaign). Additionally, or alternatively, campaign control device 235 may mark the updated campaign (e.g., associated with the updated campaign information) as ready to deploy.

As further shown in FIG. 4, if an update to the campaign is not received before deployment has begun (block 430—NO), then process 400 may include determining whether deployment of a previous campaign has been completed (block 450). For example, prior to deploying a new campaign, campaign control device 235 may determine whether a previous campaign, which the new campaign is intended to replace, has been fully deployed. A campaign may be fully deployed when campaign control device 235 has provided campaign rules for the campaign to every campaign enforcement device 230 to which the campaign is to be deployed. Additionally, or alternatively, a campaign may be fully deployed when campaign control device 235 has received confirmation from every campaign enforcement device 230, to which the campaign is to be deployed, that the campaign has been successfully deployed.

As further shown in FIG. 4, if deployment of a previous campaign has not been completed (block 450—NO), then process 400 may include returning to block 430. For example, if campaign control device 235 determines that a previous campaign, associated with a new campaign, has not been completely deployed, then campaign control device 235 may wait until the previous campaign is completely deployed before beginning deployment of the new campaign. In this way, campaign control device 235 may eliminate conflicts between different campaigns with different campaign information.

While campaign control device 235 is waiting until the previous campaign is completely deployed, campaign control device 235 may determine whether an update to the campaign has been received before deployment of the new campaign has begun, as described in more detail elsewhere herein in connection with block 430.

As further shown in FIG. 4, if deployment of a previous campaign has been completed (block 450—YES), then process 400 may include deploying the campaign and marking the campaign as being deployed (block 460). For example, if campaign control device 235 determines that a previous campaign has been completely deployed, or if there is no previous campaign associated with a new campaign, then campaign control device 235 may deploy the new campaign. Campaign control device 235 may deploy the new campaign by providing campaign rules, that instruct campaign enforcement device 230 how to handle network traffic, to campaign enforcement device(s) 230 associated with the campaign.

For example, the campaign information may identify a geographic region in which the campaign is to be deployed. Campaign control device 235 may identify campaign enforcement devices 230 located in the geographic region, and may provide campaign rules to the identified campaign enforcement devices 230. Additionally, or alternatively, the campaign information may identify one or more URLs associated with a toll-free data service, and campaign control device 235 may provide the URLs to campaign enforcement devices 230 so that campaign enforcement devices 230 may identify traffic to be treated as toll-free (e.g., traffic to be charged to the content provider).

Additionally, or alternatively, the campaign information may identify a time period during which the toll-free data service is valid, and campaign control device 235 may provide information that identifies the time period to campaign enforcement devices 230 so that campaign enforcement devices 230 may determine a time period during which to treat traffic as toll-free. Additionally, or alternatively, the campaign information may identify a quantity of data (e.g., in bytes) to be allocated to a toll-free data service, and campaign control device 235 may allocate some of the data to each of the identified campaign enforcement devices 230 so that campaign enforcement devices 230 may determine whether there is available data to be allocated to treat traffic as toll-free.

In some implementations, campaign control device 235 may mark the campaign as being deployed. Campaign control device 235 may use this marking to determine whether a campaign has been completely deployed, as described herein in connection with block 450. In some implementations, campaign control device 235 may determine that deployment has failed, and may mark the campaign as failed. In this case, campaign control device 235 may provide a notification (e.g., to campaign input device 245) that deployment of the campaign has failed.

Campaign control device 235 may generate campaign rules based on the campaign information, in some implementations. A campaign rule may specify one or more campaign conditions for charging a content provider for data used by a mobile device to access a toll-free data service, as described in more detail elsewhere herein. Campaign control device 235 may combine the generated campaign rules into a configuration file, and may provide the configuration file to one or more campaign enforcement devices 230 when deploying the campaign.

In some implementations, campaign control device 235 may generate a hash by applying a hash algorithm (e.g., SHA-1, SHA-2, MD5, etc.) to the configuration file. In this case, campaign control device 235 may provide instructions to each campaign enforcement device 230 to compute a hash of the configuration file received by campaign enforcement device 230. Campaign enforcement device 230 may apply the hash algorithm to the received configuration file to generate a hash, and may provide the generated hash to campaign control device 235. Campaign control device 235 may compare the received hash to a stored hash to verify that the configuration file was received correctly by campaign enforcement device 230. If the received hash cannot be verified, then campaign control device 235 may resend the configuration file to campaign enforcement device 230.

As further shown in FIG. 4, process 400 may include determining that campaign deployment has been completed (block 470), marking the campaign as deployed, marking any previous campaign as archived (block 480), and providing a notification that campaign deployment has been completed (block 490). For example, campaign control device 235 may determine that campaign deployment has completed when campaign rules have been provided to every campaign enforcement device 230 associated with a campaign, and/or when every campaign enforcement device 230 indicates that the campaign has been successfully deployed (e.g., that the campaign rules were successfully received and/or are being implemented).

Once campaign control device 235 determines that campaign deployment has completed, campaign control device 235 may mark the new campaign as deployed. Additionally, or alternatively, campaign control device 235 may mark any previous campaign(s), that have been replaced by the new campaign, as archived.

Additionally, or alternatively, campaign control device 235 may provide a notification that campaign deployment has been completed. For example, campaign control device 235 may provide a notification to a content provider (e.g., via an email address, via campaign input device 245, via content provider device 250, etc.). By implementing process 400, campaign control device 235 may ensure that only one conflicting campaign (e.g., where campaign information conflicts with another campaign associated with the same content provider) is being deployed at a time. This may reduce deployment errors associated with deploying toll-free data service campaigns in real time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
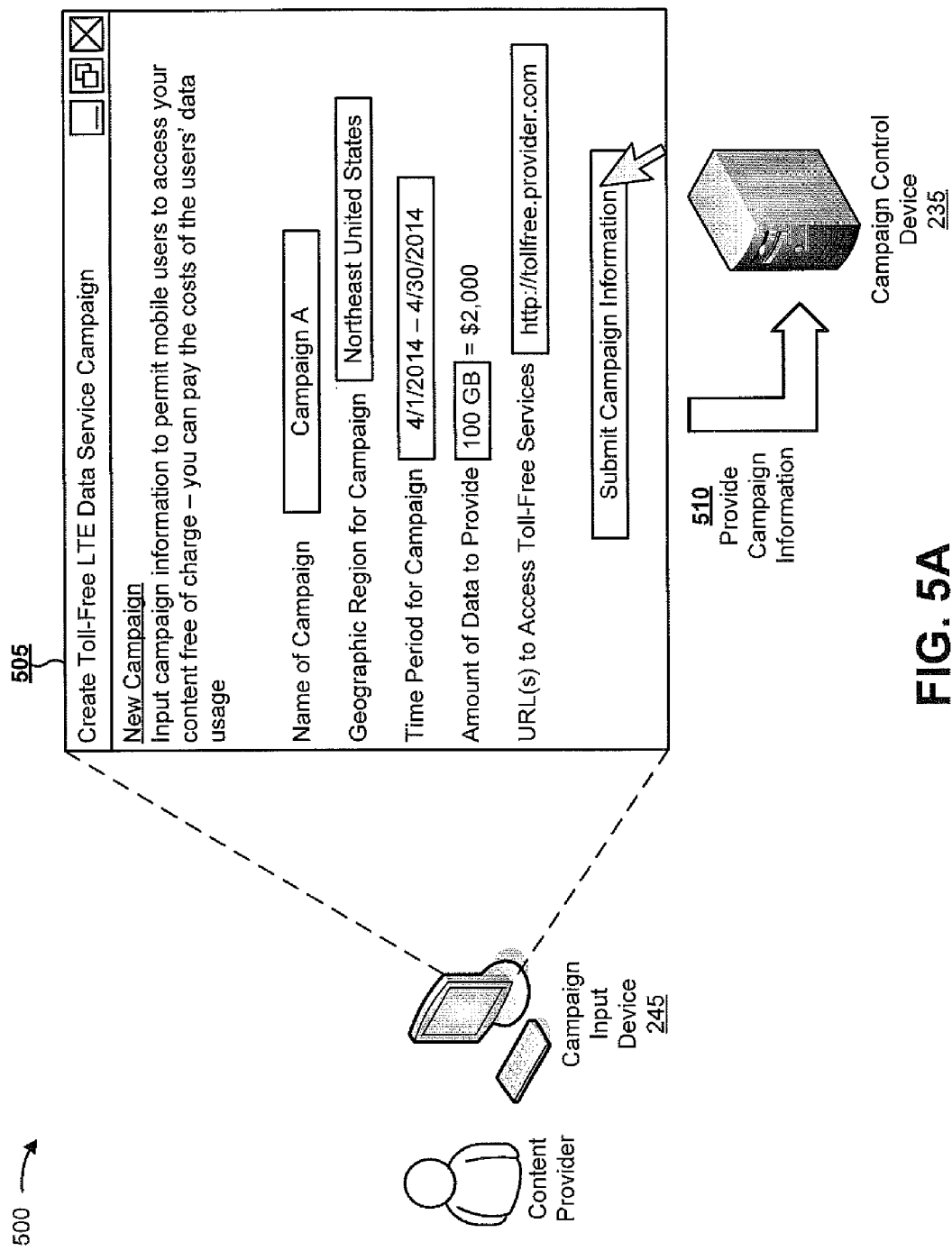
FIGS. 5A-5C are diagrams of an example implementation relating to the example process shown in FIG. 4.
Figure 5B:
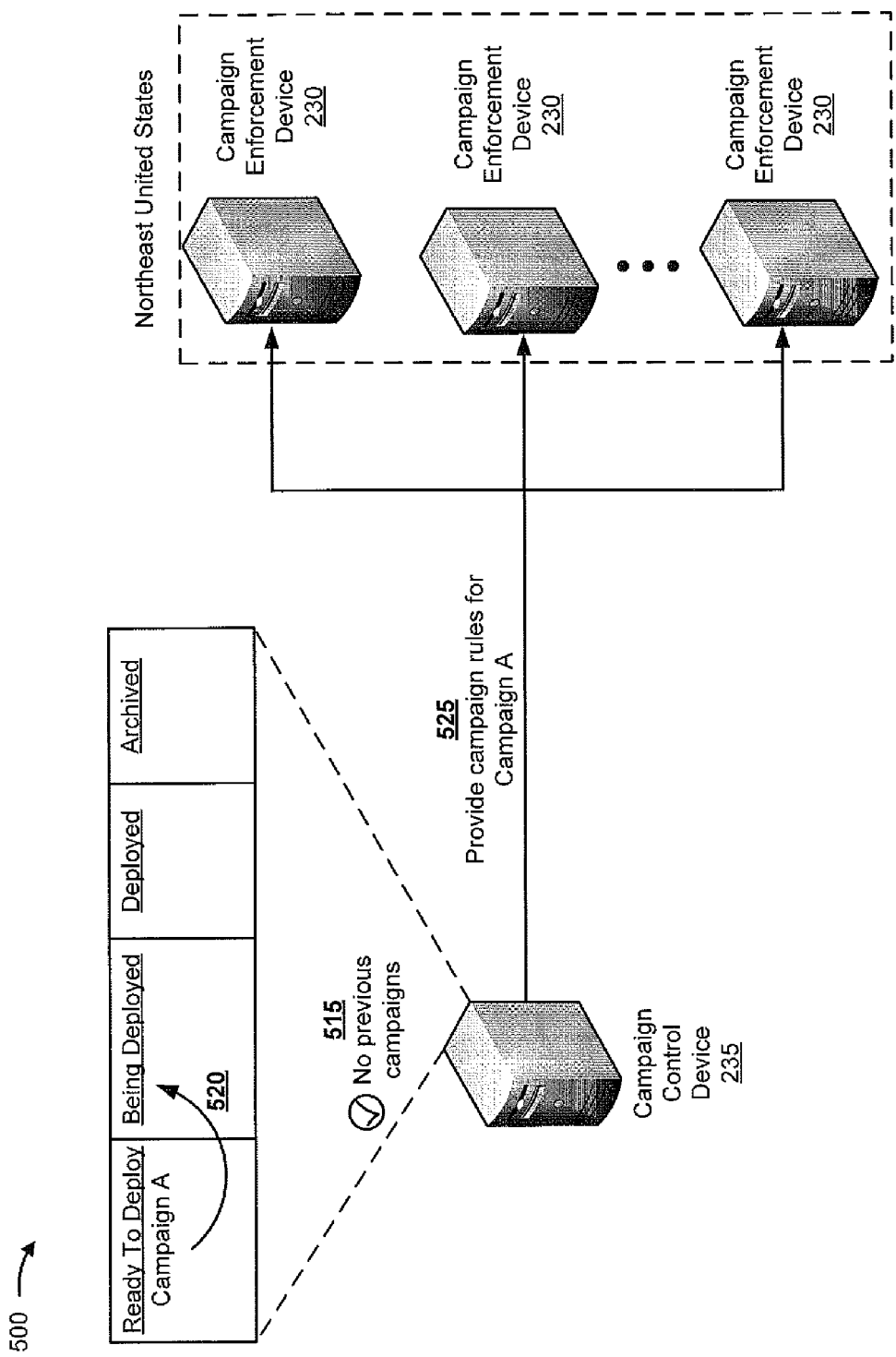
Figure 5C:
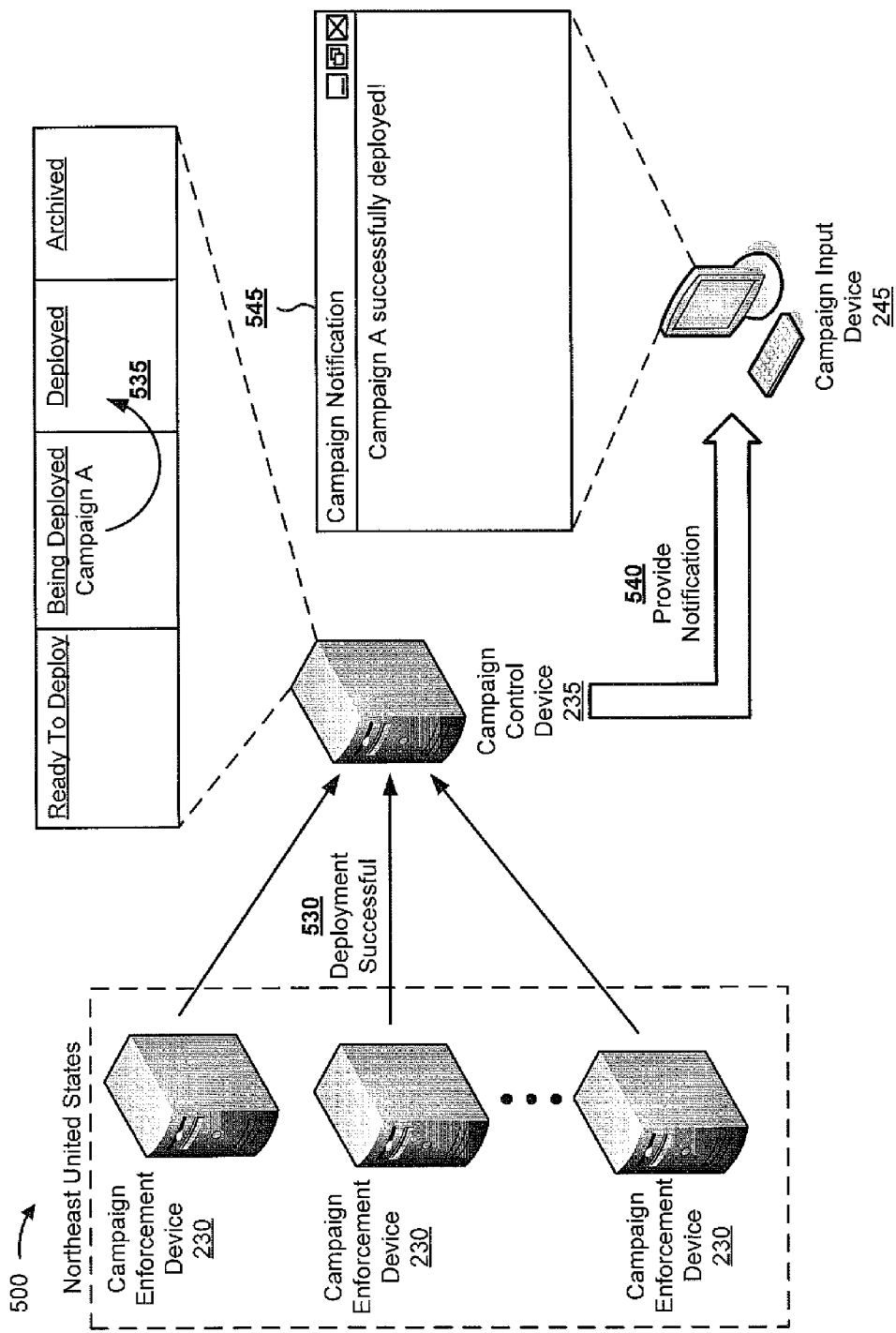

FIGS. 5A-5C are diagrams of an example implementation 500 relating to example process 400 shown in FIG. 4. FIGS. 5A-5C show an example of deploying a toll-free data service campaign.

As shown in FIG. 5A, and by reference number 505, assume that a content provider interacts with campaign input device 245 to input campaign information to create a toll-free LTE data service campaign. As shown, assume that the content provider inputs a name of the campaign (e.g., a campaign identifier), shown as "Campaign A," a geographic region for the campaign, shown as "Northeast United States," a time period for the campaign, shown as "4/1/2014-4/30/2014," an amount of data to be provided with the campaign, shown as "100 gigabytes (GB)," which corresponds to a payment of $2,000 by the content provider, and a URL to access the toll-free data service, shown as "http://tollfree.provider.com."

As further shown, assume that the content provider interacts with an input mechanism, shown as a "Submit Campaign Information" button, to cause campaign input device 245 to provide the campaign information to campaign control device 235, as shown by reference number 510.

As shown in FIG. 5B, assume that campaign control device 235 marks Campaign A as ready to deploy. As shown by reference number 515, assume that campaign control device 235 determines that there are no previous campaigns associated with Campaign A (e.g., the content provider has indicated that Campaign A is not an update to a previous campaign). Thus, as shown by reference number 520, assume that campaign control device 235 marks Campaign A as being deployed, and begins to deploy Campaign A. As shown by reference number 525, assume that campaign control device 235 deploys Campaign A by sending campaign rules for Campaign A (e.g., generated based on the campaign information received from campaign input device 245) to each campaign enforcement device 230 located in the Northeast United States.

As shown in FIG. 5C, assume that campaign control device 235 receives, from each campaign enforcement device 230 located in the Northeast United States, an indication that Campaign A was successfully deployed (e.g., was received and is being implemented), as shown by reference number 530. Based on these indications, assume that campaign control device 235 marks Campaign A as deployed, as shown by reference number 535. Further, assume that campaign control device 235 provides a notification, to campaign input device 245, that Campaign A was successfully deployed, as shown by reference number 540. As shown by reference number 545, assume that campaign input device 245 provides the notification for display, thereby notifying the content provider that Campaign A was successfully deployed.

As indicated above, FIGS. 5A-5C are provided merely as an example. Other examples are possible and may differ from what was described with regard to FIGS. 5A-5C.

FIGS. 6A-6J are diagrams of another example implementation 600 relating to example process 400 shown in FIG. 4. For the purpose of FIGS. 6A-6J, assume that the operations described above with respect to FIGS. 5A-5C have been performed.

Figure 6A:
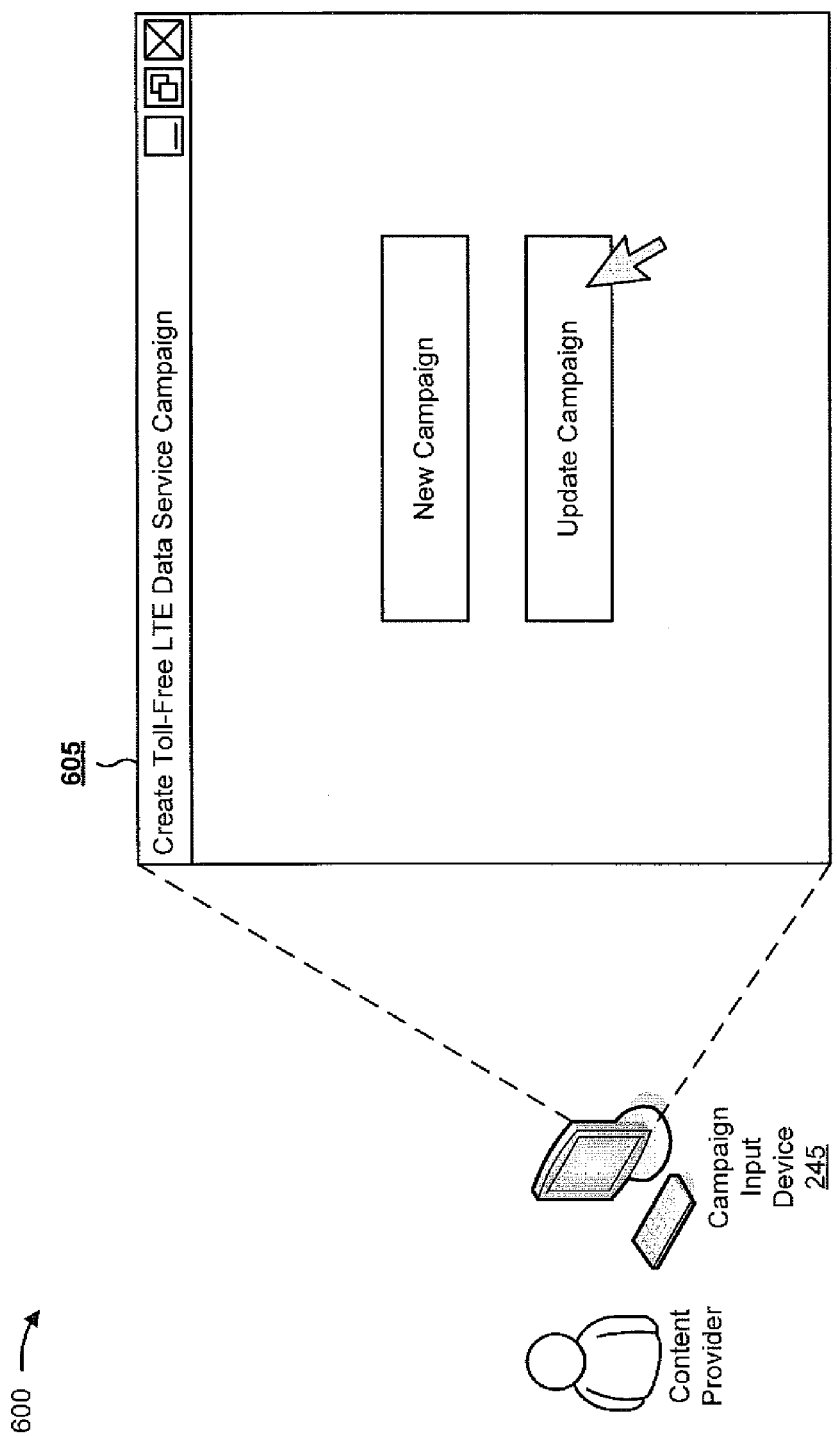
FIGS. 6A-6J are diagrams of another example implementation relating to the example process shown in FIG. 4.
Figure 6B:
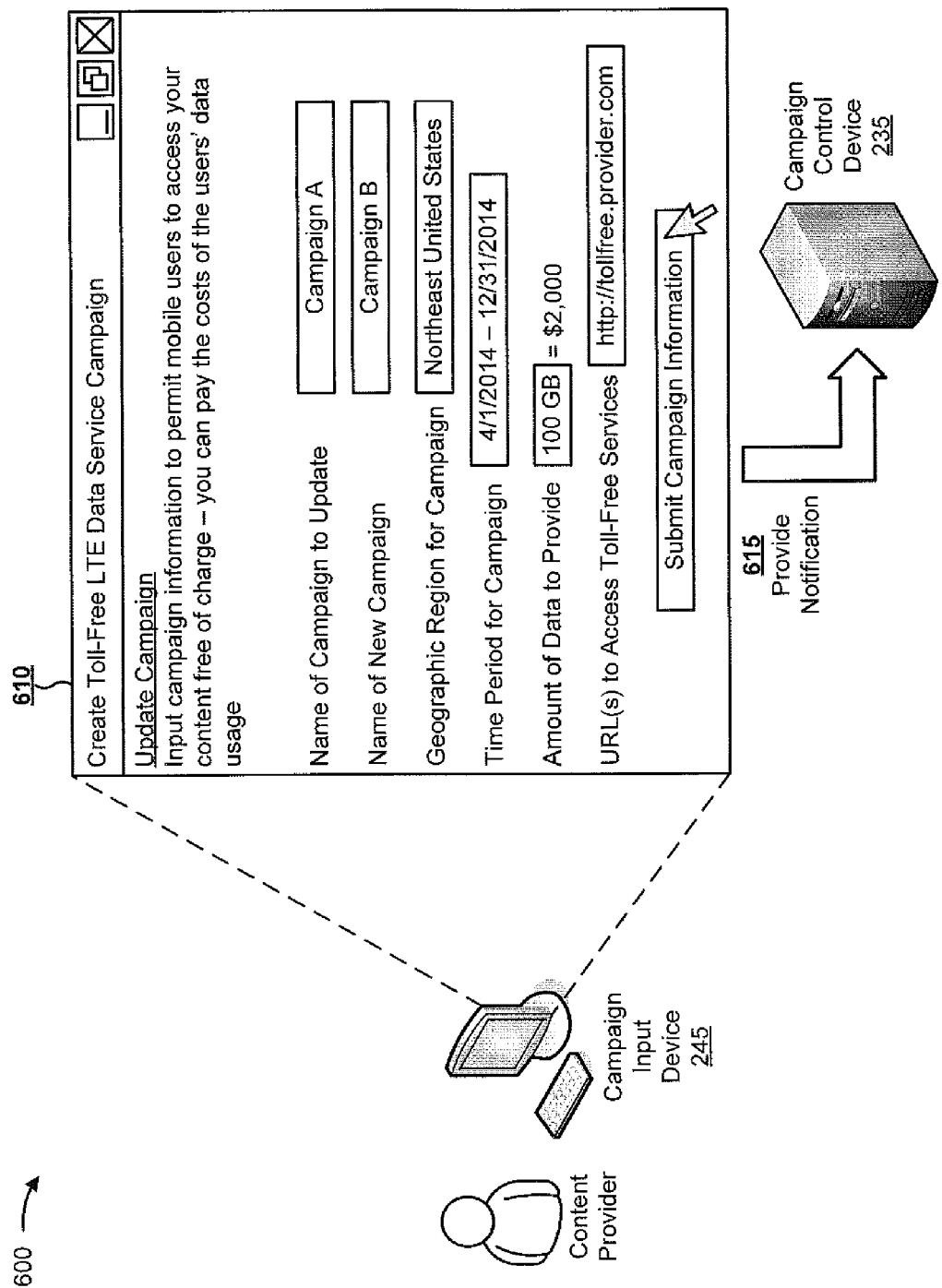

As shown in FIG. 6A, and by reference number 605, assume that a content provider interacts with campaign input device 245 to update an existing campaign. As shown in FIG. 6B, and by reference number 610, assume that the content provider interacts with campaign input device 245 to input campaign information to update Campaign A. As shown, assume that the content provider inputs information identifying a campaign to be updated, shown as "Campaign A," inputs information identifying a name of the updated campaign, shown as "Campaign B," and updates a time period for the campaign, shown as "4/1/2014-12/31/2014."

As further shown in FIG. 6B, assume that the content provider interacts with an input mechanism, shown as a "Submit Campaign Information" button, to cause campaign input device 245 to provide the updated campaign information to campaign control device 235, as shown by reference number 615.

Figure 6C:
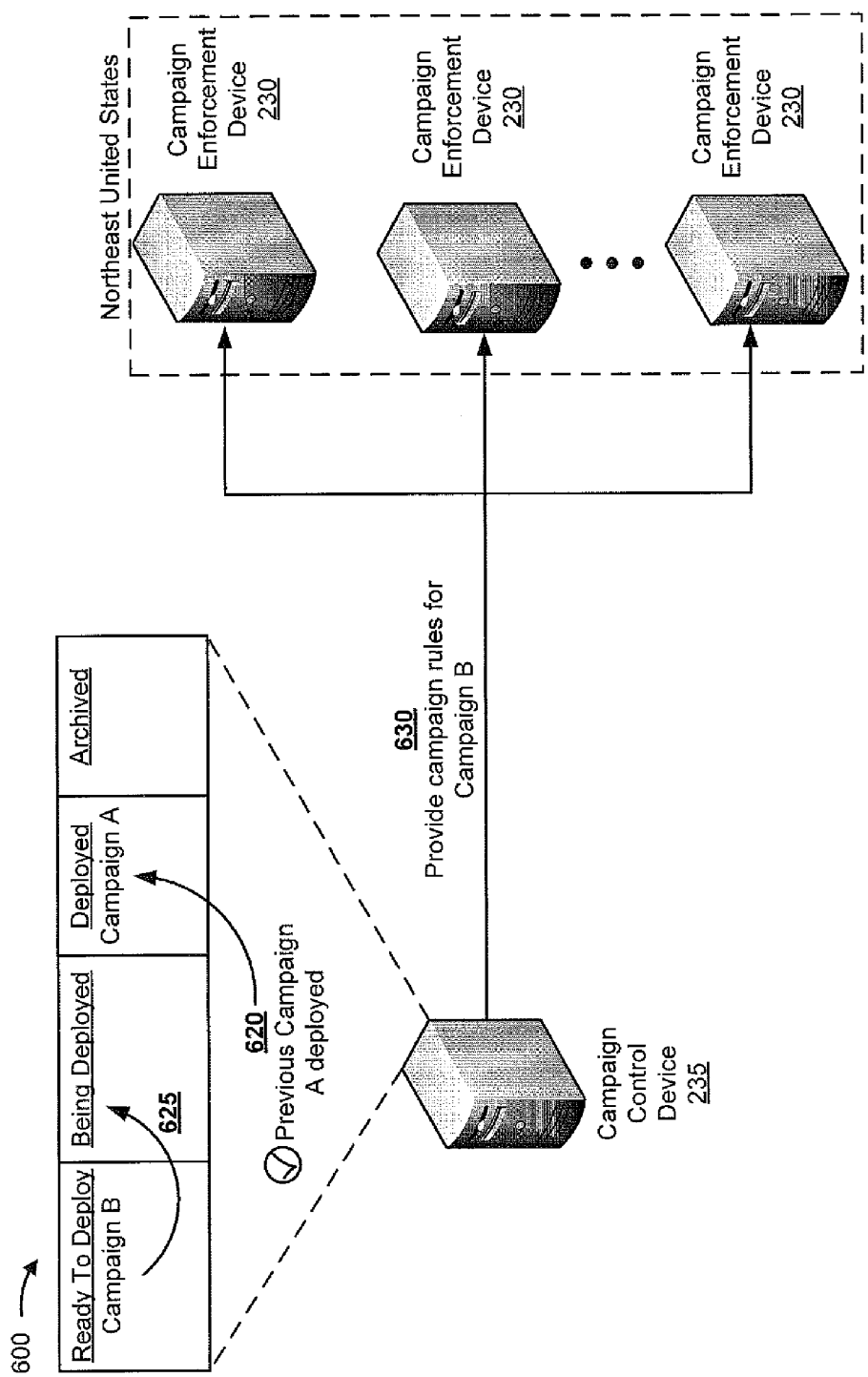

As shown in FIG. 6C, assume that campaign control device 235 marks Campaign B as ready to deploy. As shown by reference number 620, assume that campaign control device 235 determines that previous Campaign A, which is associated with Campaign B (e.g., Campaign B is an update to Campaign A), has been marked as deployed. Based on this determination, assume that campaign control device 235 marks Campaign B as being deployed, as shown by reference number 625. As shown by reference number 630, assume that campaign control device 235 begins to deploy Campaign B by providing campaign rules for Campaign B to each campaign enforcement device 230 located in the Northeast United States.

Figure 6D:
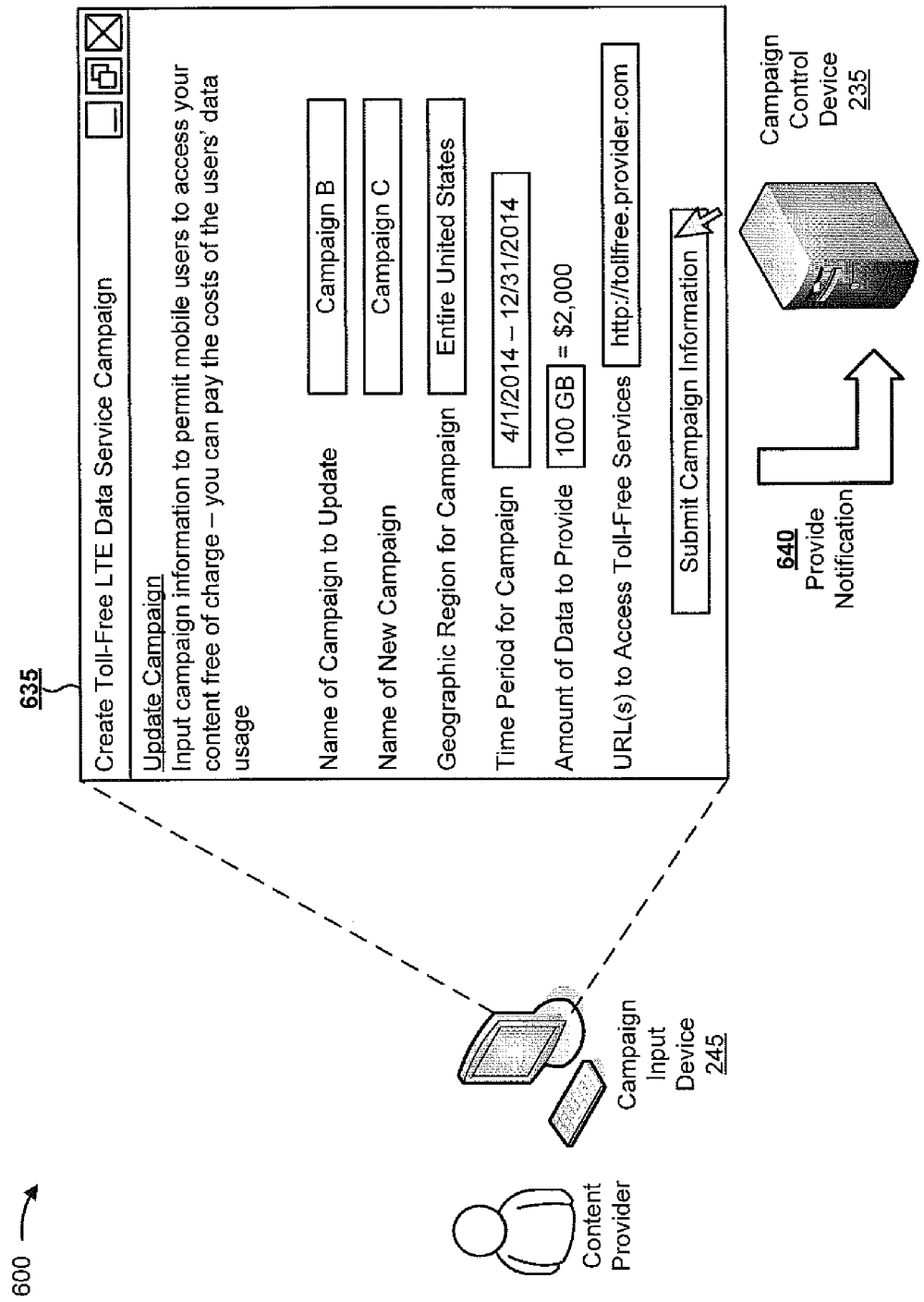

As shown in FIG. 6D, and by reference number 635, assume that while Campaign B is being deployed, the content provider interacts with campaign input device 245 to input campaign information to update Campaign B. As shown, assume that the content provider inputs information identifying a campaign to be updated, shown as "Campaign B," inputs information identifying a name of the updated campaign, shown as "Campaign C," and updates a geographic region for the campaign, shown as "Entire United States." As shown by reference number 640, assume that campaign input device 245 provides the updated campaign information to campaign control device 235.

Figure 6E:
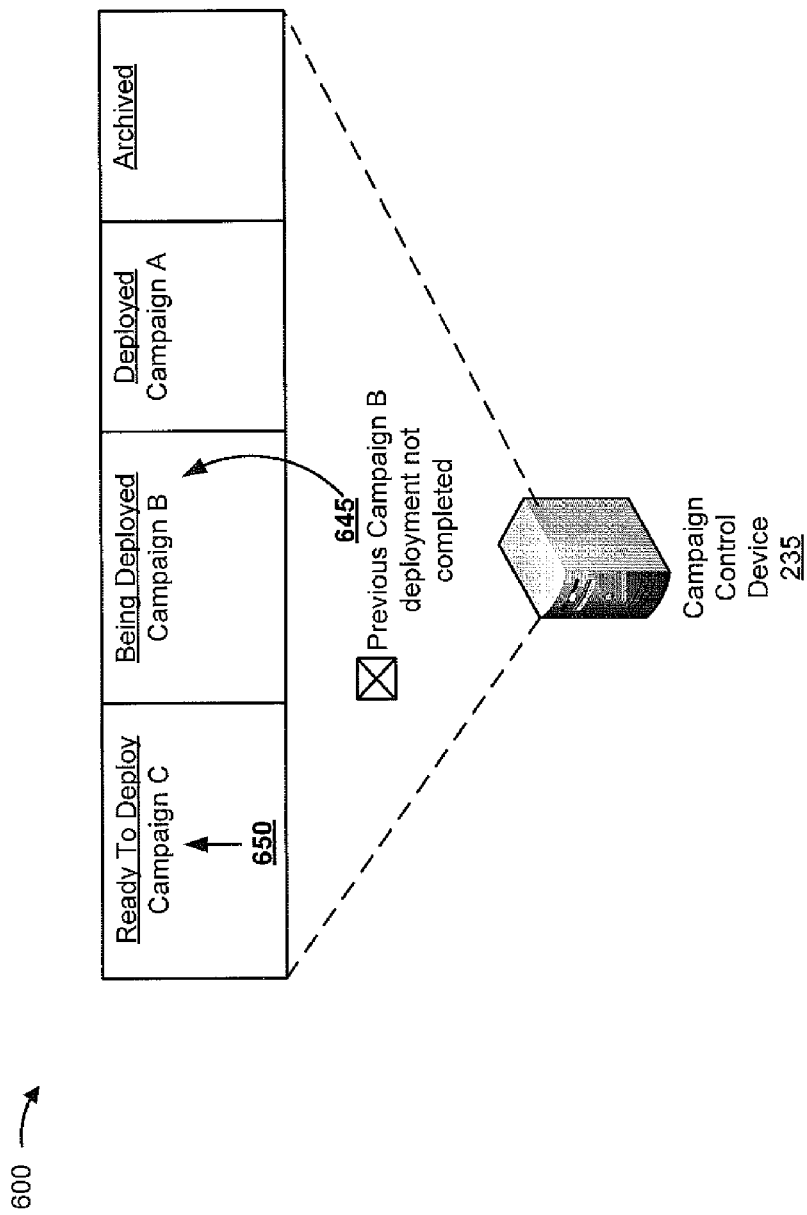

As shown in FIG. 6E, assume that campaign control device 235 marks Campaign C as ready to deploy. As shown by reference number 645, assume that campaign control device 235 determines that previous Campaign B, which is associated with Campaign C (e.g., Campaign C is an update to Campaign B), is marked as being deployed, and is not yet completely deployed (e.g., is not marked as deployed). Based on this determination, assume that campaign control device 235 does not begin deployment of Campaign C, and continues to leave Campaign C marked as ready to deploy, as shown by reference number 650.

Figure 6F:
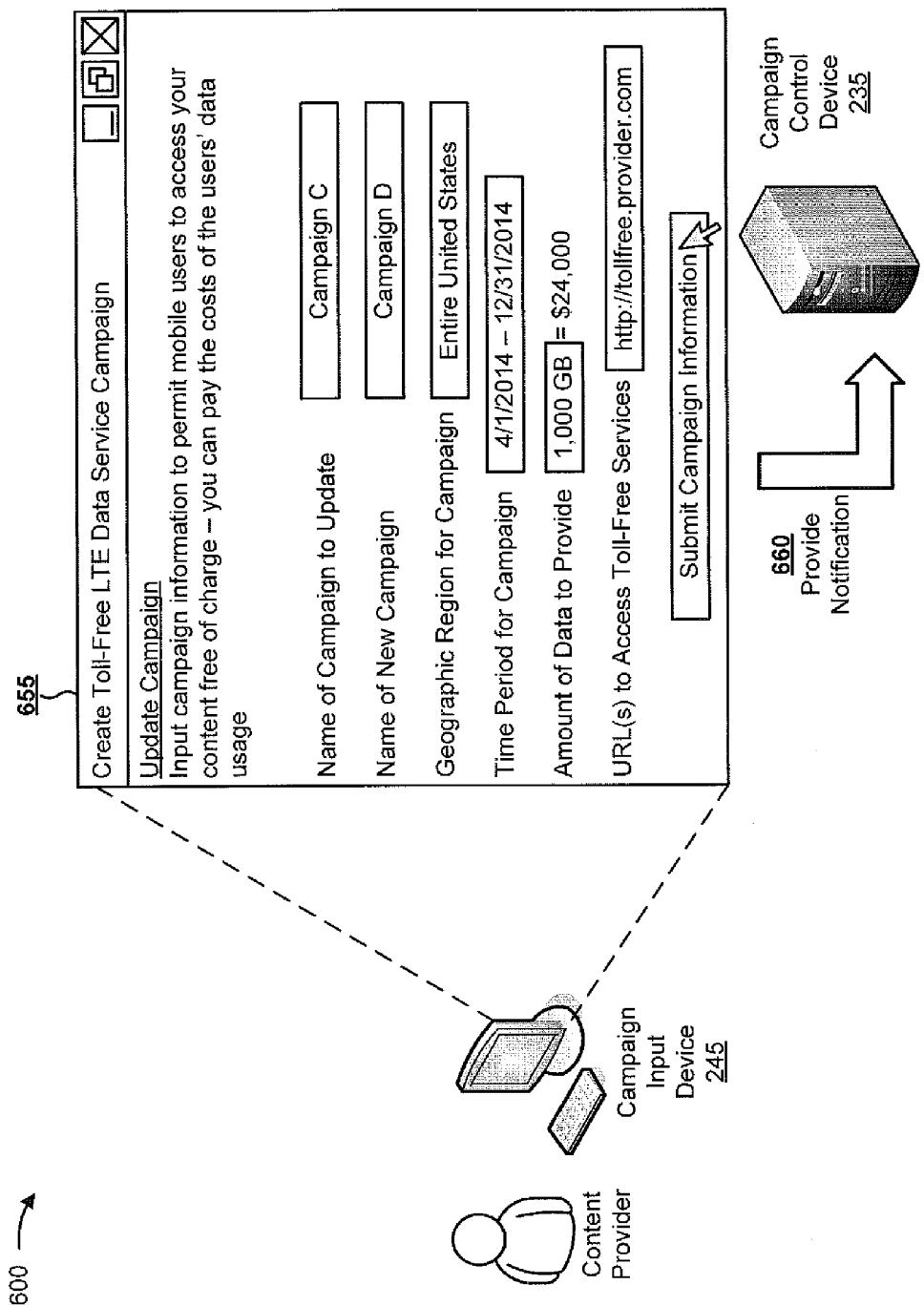

As shown in FIG. 6F, and by reference number 655, assume that while Campaign B is marked as being deployed, and while Campaign C is marked as ready to deploy, the content provider interacts with campaign input device 245 to input campaign information to update Campaign C. As shown, assume that the content provider inputs information identifying a campaign to be updated, shown as "Campaign C," inputs information identifying a name of the updated campaign, shown as "Campaign D," and updates an amount of data for the campaign, shown as "1,000 GB." As shown by reference number 660, assume that campaign input device 245 provides the updated campaign information to campaign control device 235.

Figure 6G:
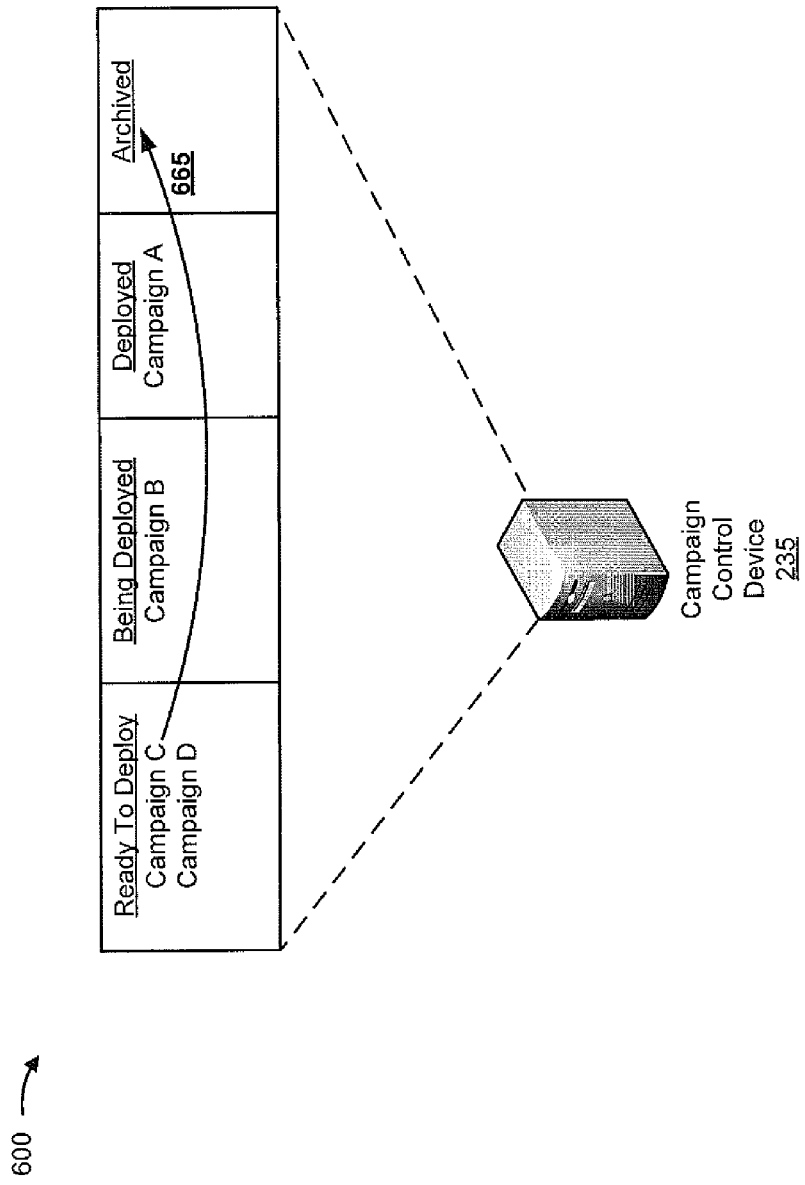

As shown in FIG. 6G, assume that campaign control device 235 marks Campaign D as ready to deploy. Further, because campaign control device 235 has not yet begun deployment of Campaign C (e.g., Campaign C is marked as ready to deploy), assume that campaign control device 235 marks Campaign C as archived, as shown by reference number 665. In this way, campaign control device 235 will not waste time deploying Campaign C when Campaign B is completely deployed, since Campaign C has been updated with Campaign D.

Figure 6H:
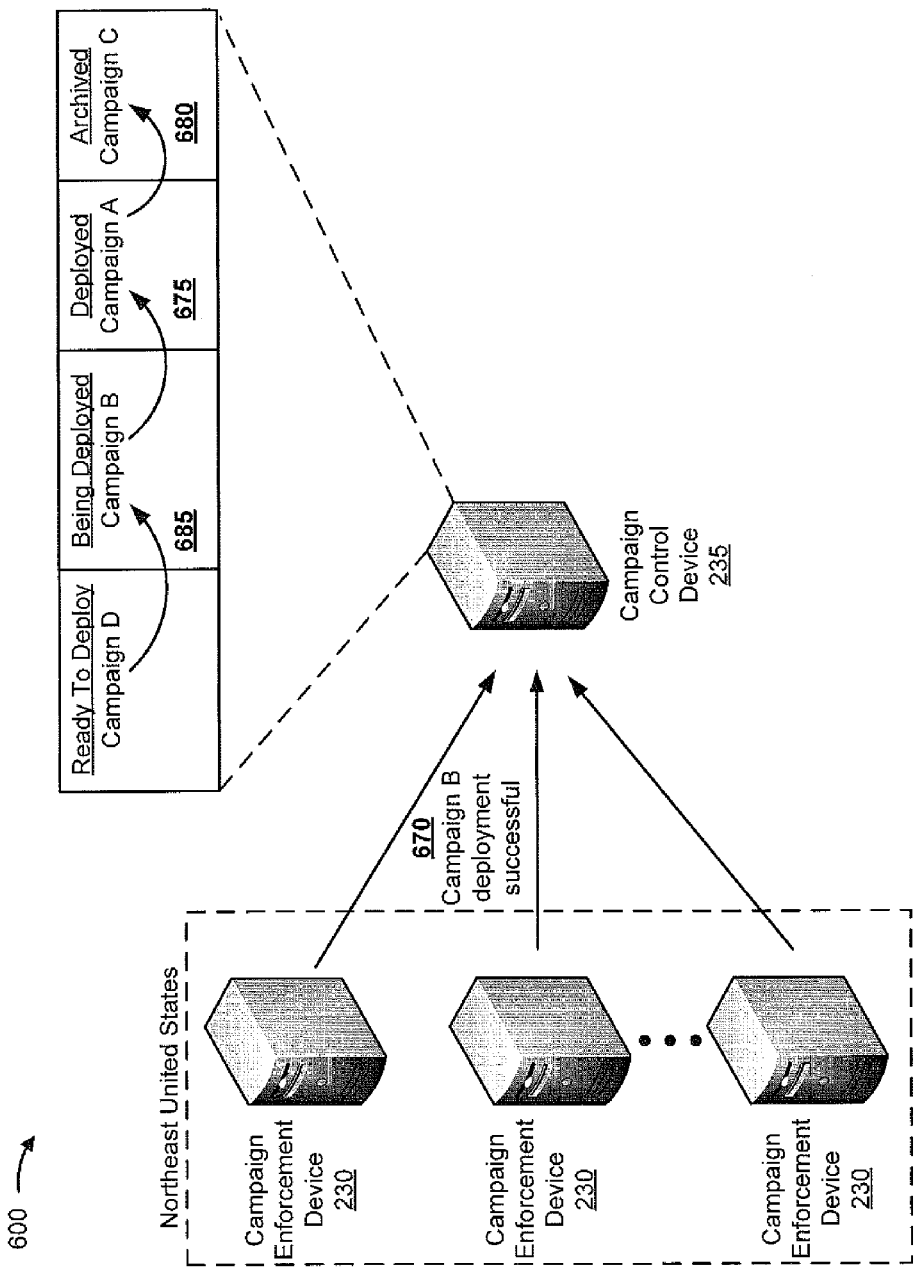

As shown in FIG. 6H, assume that campaign control device 235 receives, from each campaign enforcement device 230 located in the Northeast United States (e.g., to which campaign rules for Campaign B were provided), an indication that Campaign B was successfully deployed, as shown by reference number 670. Based on these indications, assume that campaign control device 235 marks Campaign B as deployed, as shown by reference number 675. Further, as shown by reference number 680, assume that campaign control device 230 marks Campaign A, which has been updated by Campaign B, as archived. Further, as shown by reference number 685, assume that campaign control device 235 marks Campaign D as being deployed, since Campaign B has completed deployment.

Figure 6I:
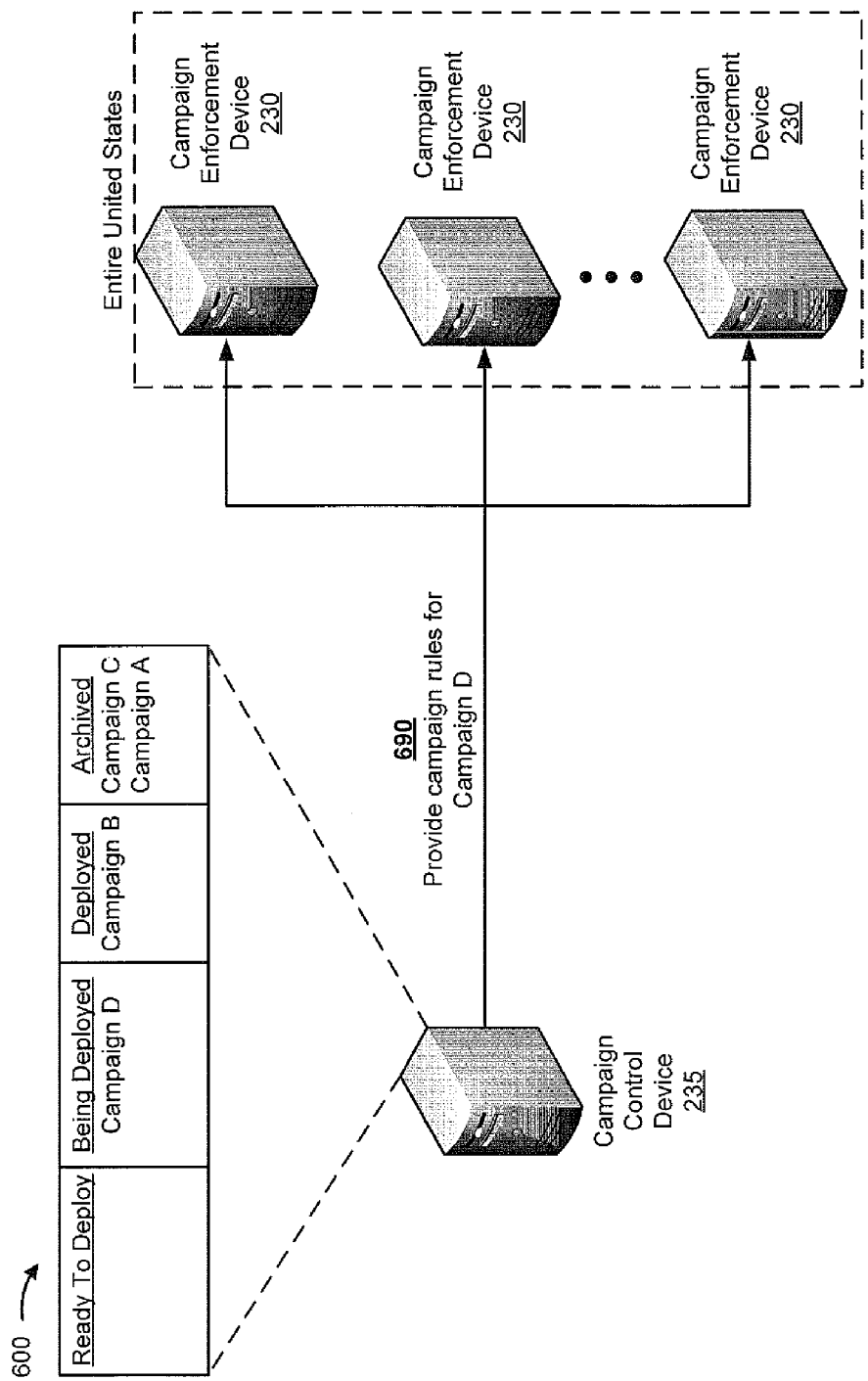

As shown in FIG. 6I, and by reference number 690, assume that campaign control device 235 begins deploying Campaign D by providing campaign rules for Campaign D to each campaign enforcement device 230 located in the Entire United States (e.g., including the campaign enforcement devices 230 located in the Northeast United States, to which campaign rules for Campaign B were provided).

Figure 6J:
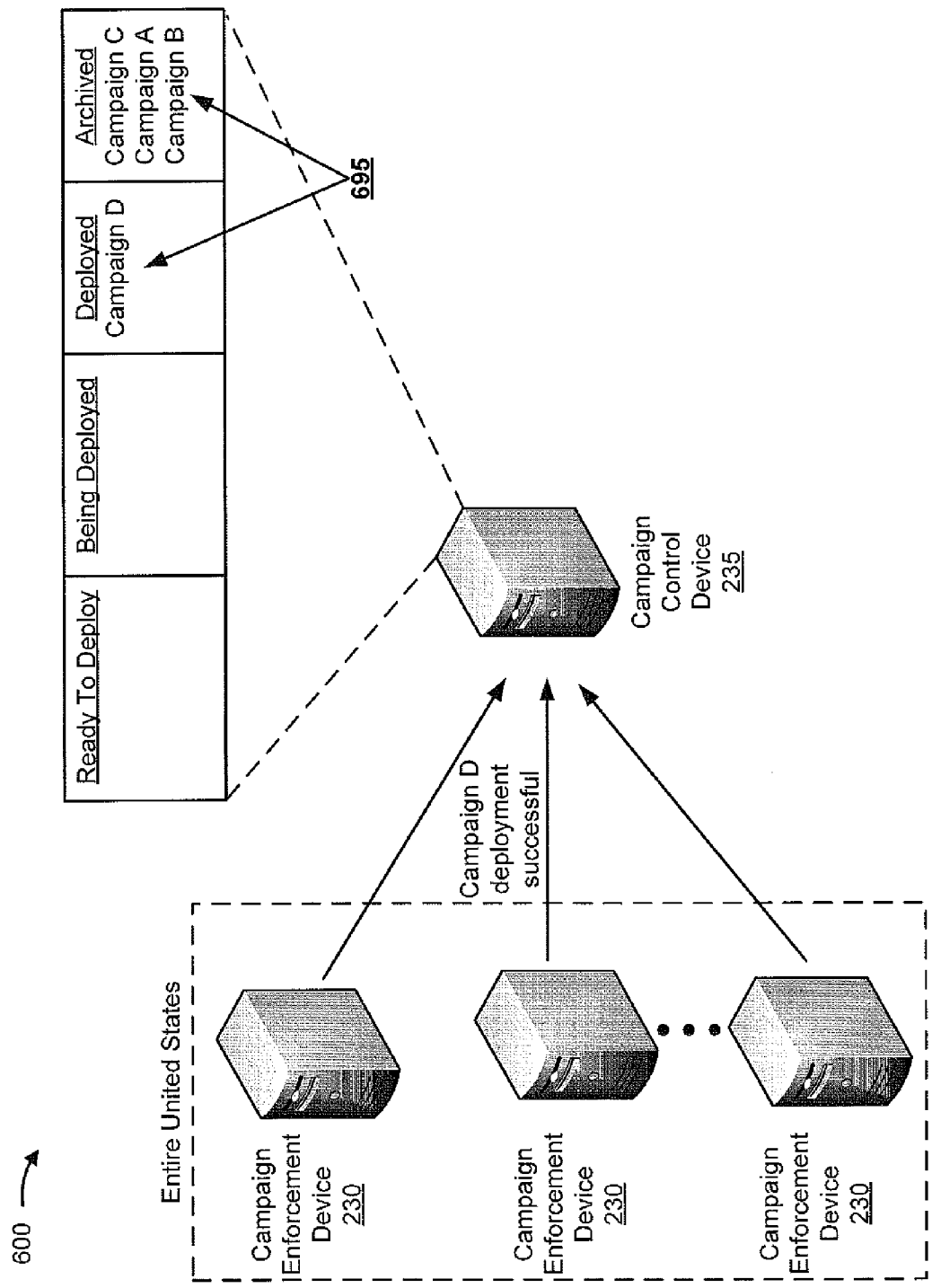

As shown in FIG. 6J, assume that campaign control device 235 receives, from each campaign enforcement device 230 located in the Entire United States (e.g., to which campaign rules for Campaign D were provided), an indication that Campaign D was successfully deployed. Based on these indications, and as shown by reference number 695, assume that campaign control device 235 marks Campaign D as deployed, and marks Campaign B, which has been updated by Campaign D, as archived. In this way, campaign control device 235 may ensure that only one conflicting campaign (e.g., where campaign information conflicts with another campaign associated with the same content provider) is being deployed at any given time. This may reduce deployment errors associated with deploying toll-free data service campaigns in real time.

As indicated above, FIGS. 6A-6J are provided merely as an example. Other examples are possible and may differ from what was described with regard to FIGS. 6A-6J.

Figure 7:
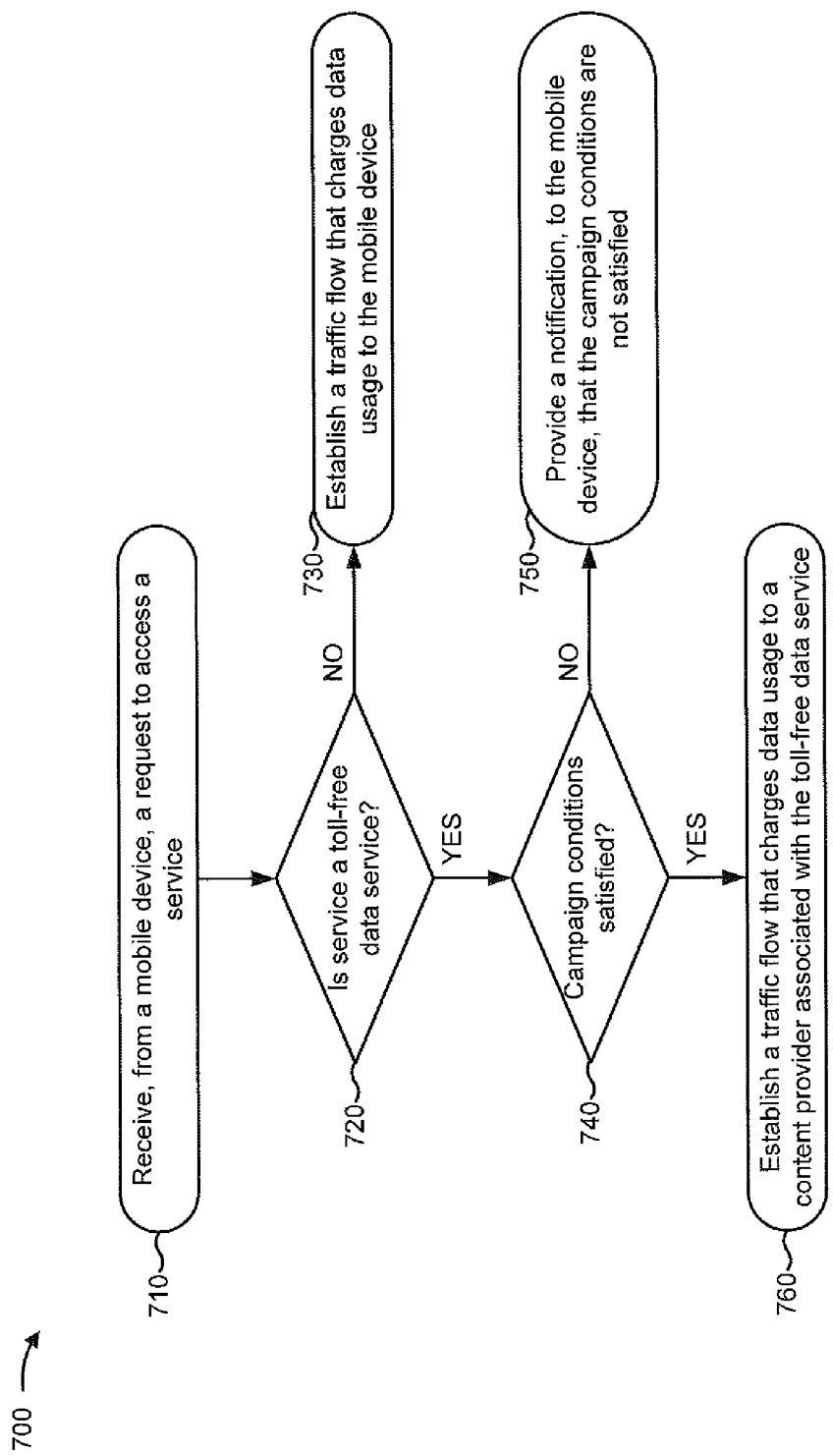
FIG. 7 is a flow chart of an example process for implementing a deployed toll-free data service campaign.

FIG. 7 is a flow chart of an example process 700 for implementing a deployed toll-free data service campaign. In some implementations, one or more process blocks of FIG. 7 may be performed by campaign enforcement device 230. In some implementations, one or more process blocks of FIG. 7 may be performed by another device or a group of devices separate from or including campaign enforcement device 230, such as mobile device 205, base station 210, MME 215, SGW 220, PGW 225, campaign control device 235, AAA 240, campaign input device 245, and/or content provider device 250.

As shown in FIG. 7, process 700 may include receiving, from a mobile device, a request to access a service (block 710), and determining whether the service is a toll-free data service (block 720). For example, campaign enforcement device 230 may receive, from mobile device 205 (e.g., via PGW 225), a request to access a service. The request may include, for example, a Hypertext Transfer Protocol (HTTP) request, a File Transfer Protocol (FTP) request, an access request, etc. The request may identify a service using a service identifier, such as a URL via which the service is provided, a network address that identifies a device that provides the service, etc.

Campaign enforcement device 230 may analyze the service identifier to determine whether the service is a toll-free data service. For example, campaign enforcement device 230 may compare the service identifier to a stored service identifier marked as being associated with a toll-free data service. If the received service identifier matches a stored service identifier, then campaign enforcement device 230 may determine that the service is a toll-free data service. If the received service identifier does not match a stored service identifier, then campaign enforcement device 230 may determine that the service is not a toll-free data service.

As further shown in FIG. 7, if the service is not a toll-free data service (block 720—NO), then process 700 may include establishing a traffic flow that charges data usage to the mobile device (block 730). For example, if campaign enforcement device 230 determines that the requested service is not a toll-free data service, then campaign enforcement device 230 may establish a traffic flow that charges data usage to the mobile device.

As an example, campaign enforcement device 230 may provide an instruction to PGW 225 to establish a traffic flow that charges mobile device 205 (e.g., and/or a user associated with mobile device 205) for data usage associated with the requested service. PGW 225 may route traffic (e.g., packets) associated with the requested service, may count a quantity of data (e.g., in bytes) used in association with the requested service, and may provide data usage information (e.g., that identifies a quantity of data used) to AAA 240. Additionally, or alternatively, service enforcement device 230 and/or PGW 225 may provide an instruction, to AAA 240, that causes that data usage information to be charged to mobile device 205.

As further shown in FIG. 7, if the service is a toll-free data service (block 720—YES), then process 700 may include determining whether campaign conditions are satisfied (block 740). For example, if campaign enforcement device 230 determines that the requested service is a toll-free data service, then campaign enforcement device 230 may determine whether one or more campaign conditions are satisfied. A campaign condition may be identified in a campaign rule received from campaign control device 235 during deployment of a toll-free data service campaign.

As an example, a campaign condition may specify a time period during which a campaign is valid. If the service request is received during the time period, then the campaign condition may be satisfied. If the service request is not received during the time period, then the campaign condition may not be satisfied. As another example, a campaign condition may specify a geographic region in which the campaign is valid. If the service request is received in the geographic region, then the campaign condition may be satisfied. If the service request is not received in the geographic region, then the campaign condition may not be satisfied.

As another example, a campaign condition may specify a quantity of bytes reserved for a campaign. Service enforcement device 230 and/or PGW 225 may determine whether there are any bytes, out of the original reserved amount of bytes, available to be allocated to the service request. For example, service enforcement device 230 may periodically request and/or may periodically receive, from service control device 235, information that identifies a quantity of available bytes. Service control device 235 may receive information regarding used bytes from one or more service enforcement devices 230, and may update the quantity of available bytes based on the received information. If there are available bytes to be allocated to the service request, then the campaign condition may be satisfied. If there are no available bytes (or not enough available bytes) to be allocated to the service request, then the campaign condition may not be satisfied.

As another example, a campaign condition may be satisfied when a campaign is not marked as paused, and may not be satisfied when the campaign is marked as paused. In some implementations, service control device 235 and/or service enforcement device 230 may mark a campaign as paused based on information received from campaign input device 245. For example, a content provider may wish to pause a campaign, and may provide an instruction to pause the campaign using campaign input device 245. In some implementations, campaign enforcement device 235 may determine whether multiple campaign conditions, described herein, are satisfied.

As further shown in FIG. 7, if the campaign conditions are not satisfied (block 740—NO), then process 700 may include providing a notification, to the mobile device, that the campaign conditions are not satisfied (block 750). For example, if campaign enforcement device 230 determines that the campaign conditions are not satisfied, then campaign enforcement device 230 may notify mobile device 205 that the campaign conditions are not satisfied. The notification may indicate a reason that the campaign conditions were not satisfied, in some implementations (e.g., not enough available bytes, a request during an invalid time period, the campaign has been paused by the content provider, etc.). Mobile device 205 may provide the notification for display so that a user may understand why the toll-free data service is not being provided.

In some implementations, the notification may provide an option for the user to access the requested service at the user's expense (e.g., indicating that the user will be charged for data usage associated with the requested service). If the user agrees to accept data charges, then campaign enforcement device 230 may establish a traffic flow that charges data usage to the mobile device, as described above in connection with block 730. Additionally, or alternatively, campaign enforcement device 230 may prevent a traffic flow, that charges a content provider associated with the toll-free data service, from being established.

As further shown in FIG. 7, if the campaign conditions are satisfied (block 740—YES), then process 700 may include establishing a traffic flow that charges data usage to a content provider associated with the toll-free data service (block 760). For example, if campaign enforcement device 230 determines that the campaign conditions are satisfied, then campaign enforcement device 230 may establish a traffic flow that charges data usage to a content provider associated with the toll-free data service (e.g., a content provider identified in campaign information for deploying the toll-free data service, a content provider that input the campaign information, etc.).

As an example, campaign enforcement device 230 may provide an instruction to PGW 225 to establish a traffic flow that charges the content provider for data usage associated with the requested service. PGW 225 may route traffic (e.g., packets) associated with the requested service, may count a quantity of data (e.g., in bytes) used in association with the requested service, and may provide data usage information (e.g., that identifies a quantity of data used) to AAA 240. Additionally, or alternatively, service enforcement device 230 and/or PGW 225 may provide an instruction, to AAA 240, that causes that data usage information to be charged to the content provider. In this way, a toll-free data service campaign may be implemented according to campaign information provided by a content provider that provides the toll-free data service.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
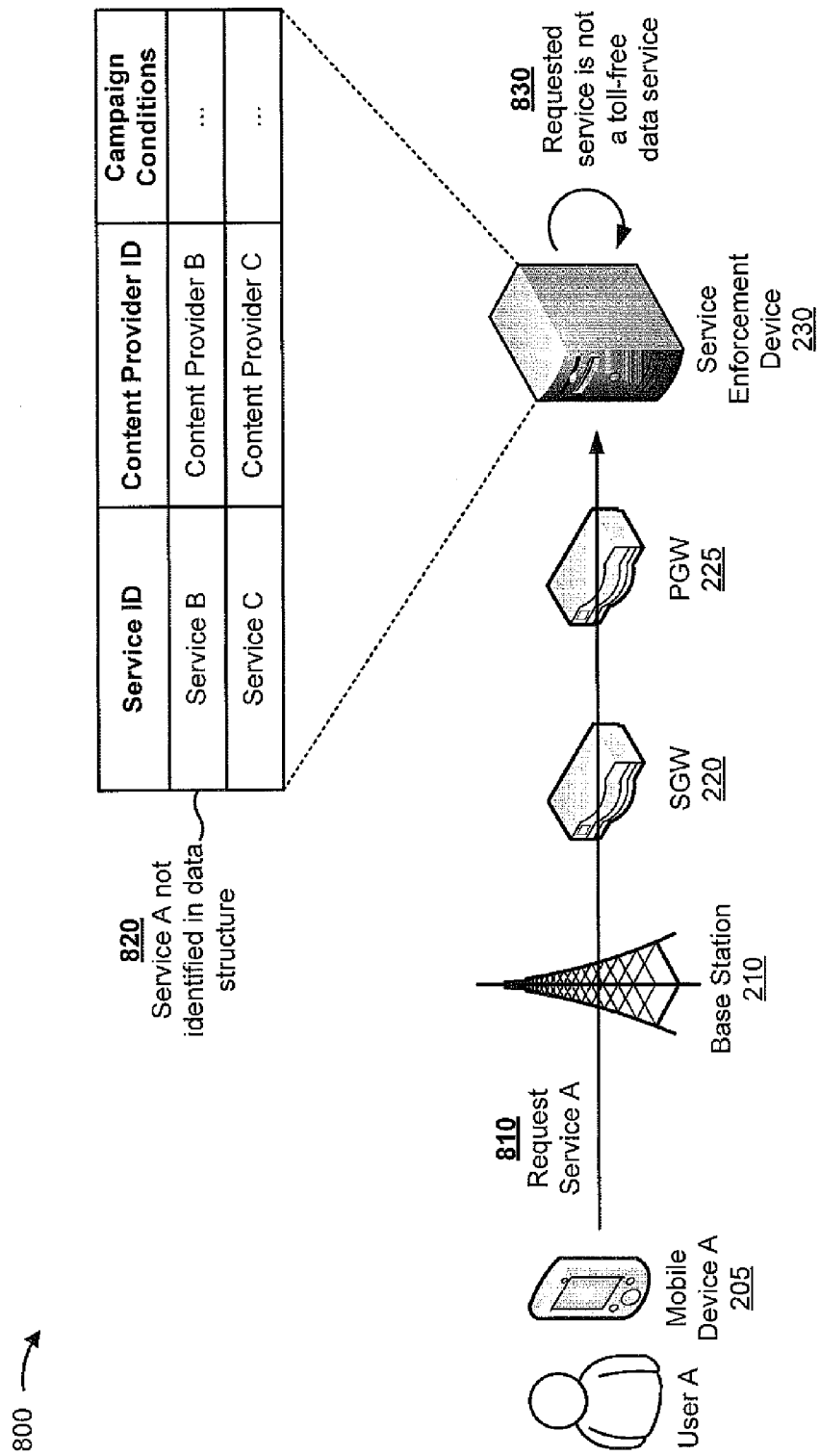
FIGS. 8A and 8B are diagrams of an example implementation relating to the example process shown in FIG. 7.
Figure 8B:
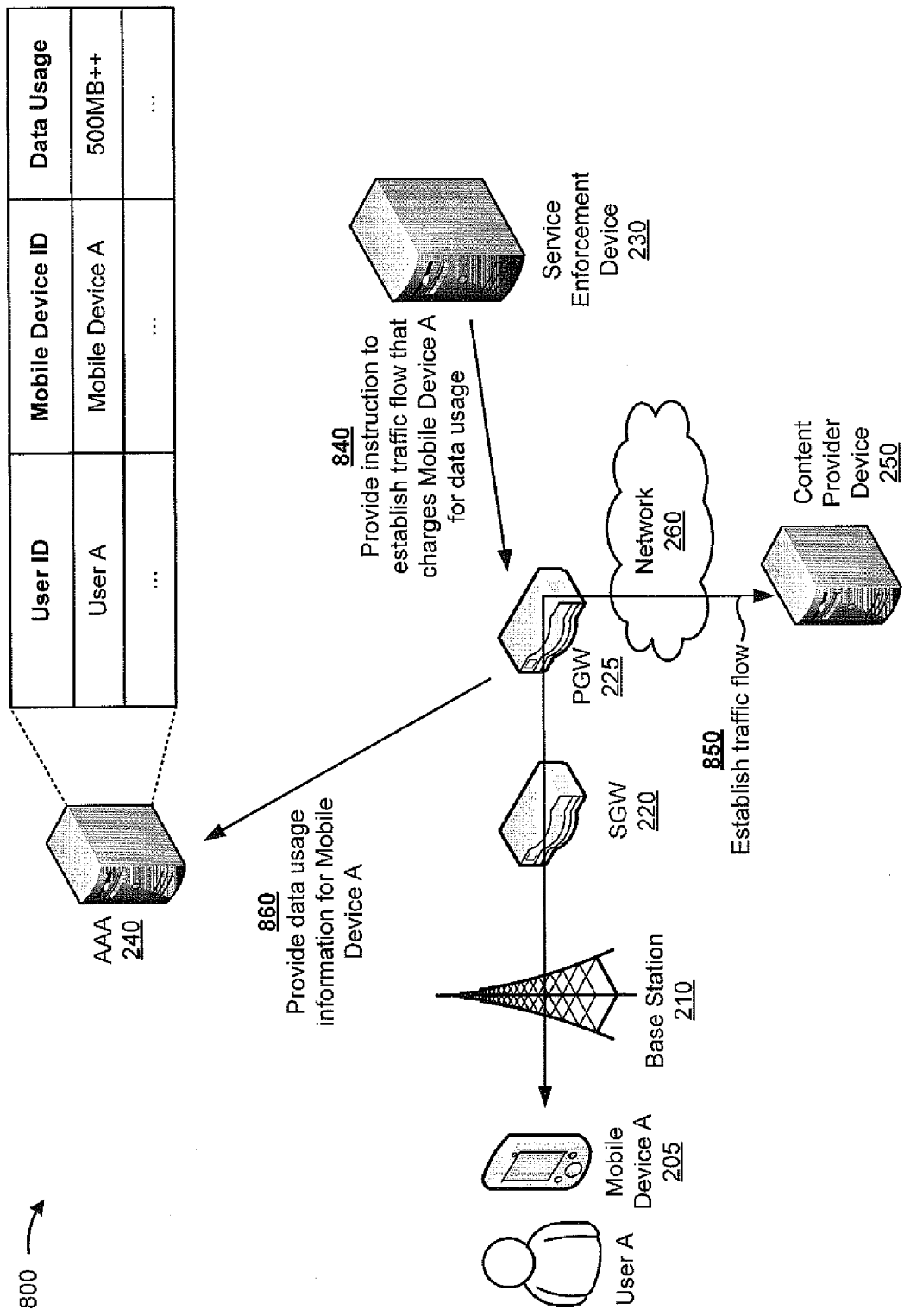

FIGS. 8A and 8B are diagrams of an example implementation 800 relating to example process 700 shown in FIG. 7. FIGS. 8A and 8B show an example of implementing a deployed toll-free data service campaign.

As shown in FIG. 8A, and by reference number 810, assume that a user, shown as User A, interacts with mobile device 205, shown as Mobile Device A, to request a service. As further shown, assume that the request includes a service identifier, shown as Service A, that identifies the requested service. As further shown, assume that service enforcement device 230 receives the request and the service identifier. As shown by reference number 820, assume that service enforcement device 230 compares the received service identifier to a list of stored service identifiers, and determines that the received service identifier does not match a stored service identifier. Thus, as shown by reference number 830, service enforcement device 230 determines that the requested service is not a toll-free data service.

As shown in FIG. 8B, and by reference number 840, based on determining that the requested service is not a toll-free data service, assume that service enforcement device 230 provides an instruction, to PGW 225, to establish a traffic flow that charges Mobile Device A for data usage. As shown by reference number 850, assume that PGW 225 assists in establishing the traffic flow between mobile device 205 (e.g., Mobile Device A) and content provider device 250 (e.g., identified in the request). As shown by reference number 860, assume that PGW 225 provides data usage information, for Mobile Device A, to AAA 240. Based on the received data usage information, assume that AAA 240 updates accounting information for Mobile Device A, which indicates a quantity of bytes used by Mobile Device A in association with the established traffic flow. In this way, AAA 240 may charge mobile device 205 for data usage when mobile device 205 requests a service that is not a toll-free data service.

As indicated above, FIGS. 8A and 8B are provided merely as an example. Other examples are possible and may differ from what was described with regard to FIGS. 8A and 8B.

Figure 9A:
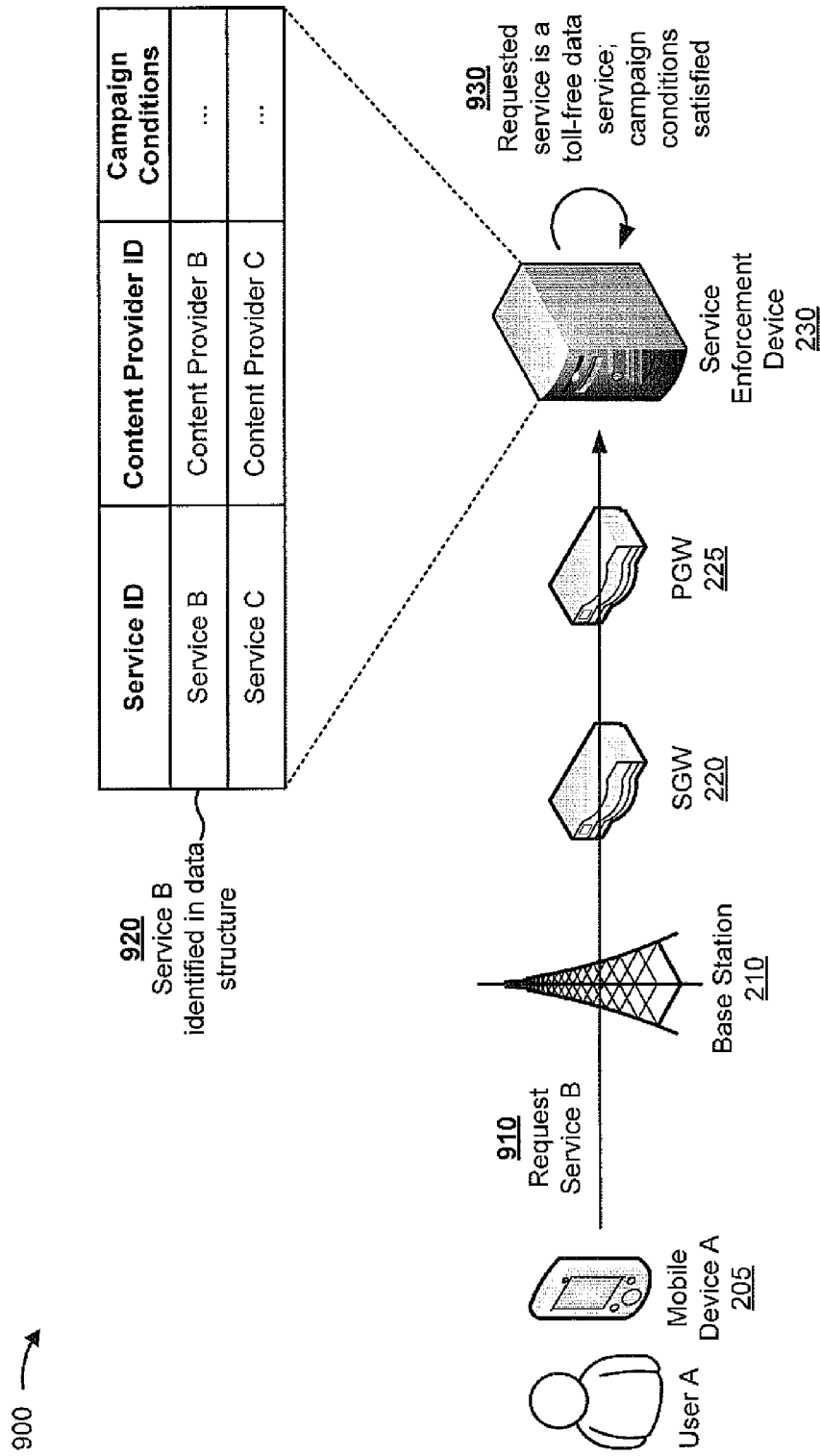
FIGS. 9A and 9B are diagrams of another example implementation relating to the example process shown in FIG. 7.
Figure 9B:
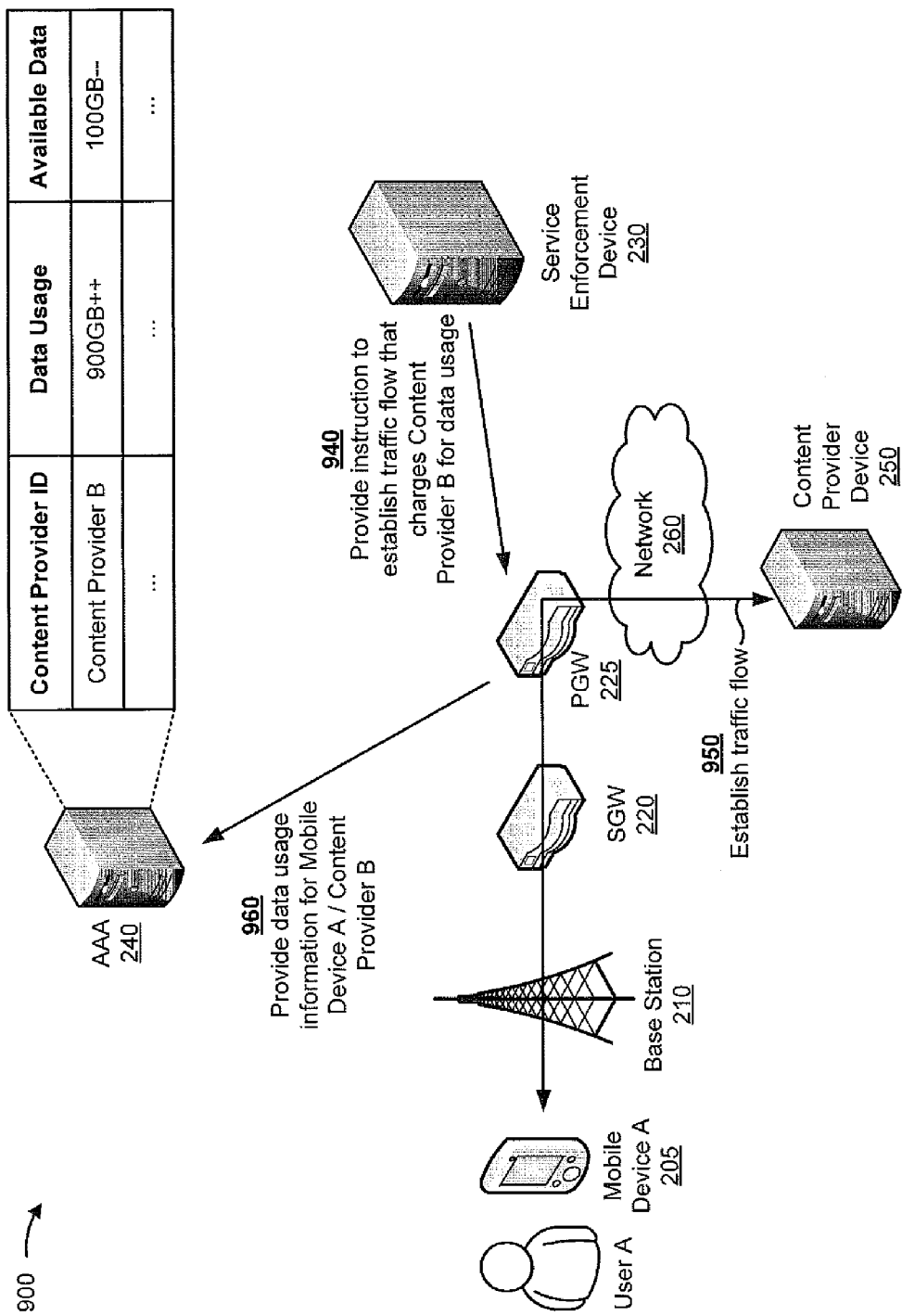

FIGS. 9A and 9B are diagrams of another example implementation 900 relating to example process 700 shown in FIG. 7. FIGS. 9A and 9B show another example of implementing a deployed toll-free data service campaign.

As shown in FIG. 9A, and by reference number 910, assume that a user, shown as User A, interacts with mobile device 205, shown as Mobile Device A, to request a service. As further shown, assume that the request includes a service identifier, shown as Service B, that identifies the requested service. As further shown, assume that service enforcement device 230 receives the request and the service identifier. As shown by reference number 920, assume that service enforcement device 230 compares the received service identifier to a list of stored service identifiers, and determines that the received service identifier matches a stored service identifier. Thus, as shown by reference number 930, service enforcement device 230 determines that the requested service is a toll-free data service. Further, assume that service enforcement device 230 determines that all specified campaign conditions, associated with the toll-free data service, are satisfied.

As shown in FIG. 9B, and by reference number 940, assume that service enforcement device 230 provides an instruction, to PGW 225, to establish a traffic flow that charges Content Provider B (e.g., which provides Service B) for data usage. As shown by reference number 950, assume that PGW 225 assists in establishing the traffic flow between mobile device 205 (e.g., Mobile Device A) and content provider device 250 (e.g., identified in the request). As shown by reference number 960, assume that PGW 225 provides data usage information, for the traffic flow between Mobile Device A and content provider device 250, to AAA 240. Based on the received data usage information, assume that AAA 240 updates accounting information for Content Provider B, which indicates a quantity of bytes used by Mobile Device A in association with the established traffic flow. In this way, AAA 240 may charge a content provider for data usage when mobile device 205 requests a toll-free data service.

As indicated above, FIGS. 9A and 9B are provided merely as an example. Other examples are possible and may differ from what was described with regard to FIGS. 9A and 9B.

Implementations described herein describe architectures and operations for efficient and effective deployment of toll-free data service campaigns, and assist in reducing errors associated with deploying toll-free data service campaigns.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a communication interface; and
    one or more processors, communicatively coupled to the communication interface to:
        receive campaign information for deploying a toll-free data service campaign,
            the campaign information identifying a geographic region in which the toll-free data service campaign is to be deployed;
        mark the toll-free data service campaign as ready to deploy;
        generate one or more campaign rules based on the campaign information,
            the one or more campaign rules identifying one or more conditions for charging a content provider, associated with the toll-free data service campaign, for data used by a mobile device in association with the toll-free data service campaign;
        deploy the toll-free data service campaign by providing, to one or more enforcement devices associated with the geographic region, the one or more campaign rules;
        mark the toll-free data service campaign as being deployed based on deploying the toll-free data service campaign;
        determine that deployment of the toll-free data service campaign has been completed; and
        mark the toll-free data service campaign as deployed based on determining that deployment of the toll-free data service campaign has been completed.

2. The device of claim 1,
    where the one or more processors are further to:
        determine that a previous campaign, associated with the toll-free data service campaign, is marked as ready to deploy; and
        replace previous campaign information, associated with the previous campaign, with the campaign information for deploying the toll-free data service campaign based on determining that the previous campaign is marked as ready to deploy, and
    where the one or more processors, when deploying the toll-free data service campaign, are to:
        deploy the toll-free data service campaign based on replacing the previous campaign information with the campaign information for deploying the toll-free data service campaign.

3. The device of claim 1,
    where the one or more processors are further to:
        determine that a previous campaign, associated with the toll-free data service campaign, is marked as being deployed;
        prevent the toll-free data service campaign from being deployed while the previous campaign is marked as being deployed; and
        determine that deployment of the previous campaign has been completed, and
    where the one or more processors, when deploying the toll-free data service campaign, are to:
        deploy the toll-free data service campaign based on determining that deployment of the previous campaign has been completed.

4. The device of claim 1,
    where the one or more processors are further to:
        determine that there are no previous campaigns associated with the toll-free data service campaign, and
    where the one or more processors, when deploying the toll-free data service campaign, are to:
        deploy the toll-free data service campaign based on determining that there are no previous campaigns associated with the toll-free data service campaign.

5. The device of claim 1, where the one or more processors, when determining that the deployment of the toll-free data service campaign has been completed, are to:
    receive one or more indications, from the one or more enforcement devices, that the toll-free data service campaign has been successfully deployed; and
    determine that the deployment of the toll-free data service campaign has been completed based on receiving the one or more indications.

6. The device of claim 1, where the one or more processors are further to:
    receive updated campaign information, for an updated campaign, to replace the campaign information associated with the toll-free data service campaign;
    determine that the toll-free data service campaign is marked as deployed based on marking the toll-free data service campaign as deployed; and
    deploy the updated campaign based on determining that the toll-free data service campaign is marked as deployed.

7. The device of claim 6, where the one or more processors are further to:
    determine that deployment of the updated campaign has been completed;
    mark the updated campaign as deployed based on determining that deployment of the updated campaign has been completed; and
    mark the toll-free data service campaign as archived based on determining that deployment of the updated campaign has been completed.

8. A computer-readable medium storing instructions, the instructions comprising:
    one or more instructions that, when executed by one or more processors, cause the one or more processors to:
        receive campaign information for deploying a toll-free data service campaign,
            the campaign information including information that identifies a plurality of enforcement devices to which the toll-free data service campaign is to be deployed;
        mark the toll-free data service campaign as ready to deploy;

generate one or more campaign rules based on the campaign information,
the one or more campaign rules identifying one or more conditions for charging a content provider, associated with the toll-free data service campaign, for data used by a mobile device to access a toll-free data service identified in the campaign information;
deploy the toll-free data service campaign by providing, to the plurality of enforcement devices, the one or more campaign rules;
mark the toll-free data service campaign as being deployed based on deploying the toll-free data service campaign;
determine that deployment of the toll-free data service campaign has been completed; and
mark the toll-free data service campaign as deployed based on determining that deployment of the toll-free data service campaign has been completed.

9. The computer-readable medium of claim 8,
where the one or more instructions, when executed by the one or more processors, further cause the one or more processors to:
determine that a previous campaign, to be replaced by the toll-free data service campaign, is marked as ready to deploy; and
replace previous campaign information, associated with the previous campaign, with the campaign information for deploying the toll-free data service campaign based on determining that the previous campaign is marked as ready to deploy, and
where the one or more instructions, that cause the one or more processors to deploy the toll-free data service campaign, cause the one or more processors to:
deploy the toll-free data service campaign based on replacing the previous campaign information with the campaign information for deploying the toll-free data service campaign.

10. The computer-readable medium of claim 8,
where the one or more instructions, when executed by the one or more processors, further cause the one or more processors to:
determine that a previous campaign, to be replaced by the toll-free data service campaign, is marked as being deployed;
prevent the toll-free data service campaign from being deployed while the previous campaign is marked as being deployed; and
determine that deployment of the previous campaign has been completed, and
where the one or more instructions, that cause the one or more processors to deploy the toll-free data service campaign, cause the one or more processors to:
deploy the toll-free data service campaign based on determining that deployment of the previous campaign has been completed.

11. The computer-readable medium of claim 8,
where the one or more instructions, when executed by the one or more processors, further cause the one or more processors to:
determine that there are no previous campaigns to be replaced by the toll-free data service campaign, and
where the one or more instructions, that cause the one or more processors to deploy the toll-free data service campaign, cause the one or more processors to:
deploy the toll-free data service campaign based on determining that there are no previous campaigns to be replaced by the toll-free data service campaign.

12. The computer-readable medium of claim 8, where the one or more instructions, that cause the one or more processors to determine that deployment of the toll-free data service campaign has been completed, cause the one or more processors to:
determine that the toll-free data service campaign has been successfully deployed on the plurality of enforcement devices; and
determine that deployment of the toll-free data service campaign has been completed based on determining that the toll-free data service campaign has been successfully deployed on the plurality of enforcement devices.

13. The computer-readable medium of claim 8, where the one or more instructions, when executed by the one or more processors, further cause the one or more processors to:
receive updated campaign information, for an updated campaign, to replace the campaign information associated with the toll-free data service campaign;
determine that the toll-free data service campaign is marked as deployed based on marking the toll-free data service campaign as deployed; and
deploy the updated campaign based on determining that the toll-free data service campaign is marked as deployed.

14. The computer-readable medium of claim 8,
where the campaign information further includes information identifying a network address for accessing the toll-free data service, and
where the one or more instructions, that cause the one or more processors to generate the one or more campaign rules, cause the one or more processors to:
generate the one or more campaign rules based on the information identifying the network address,
the one or more campaign rules instructing the plurality of enforcement devices to charge the content provider for data used by the mobile device when the mobile device accesses the toll-free data service using the network address.

15. A method, comprising:
receiving, by a control device, campaign information for deploying a toll-free data service campaign,
the campaign information including information that identifies one or more enforcement devices to which the toll-free data service campaign is to be deployed;
marking, by the control device, the toll-free data service campaign as ready to deploy; generating, by the control device, a campaign rule based on the campaign information,
the campaign rule identifying a condition for charging a content provider, associated with the toll-free data service campaign, for data used by a mobile device to access a toll-free data service;
deploying, by the control device, the toll-free data service campaign by providing the campaign rule to the one or more enforcement devices;
marking, by the control device, the toll-free data service campaign as being deployed based on deploying the toll-free data service campaign;
determining, by the control device, that deployment of the toll-free data service campaign has been completed; and marking, by the control device, the toll-free data service campaign as deployed based on determining that deployment of the toll-free data service campaign has been completed.

16. The method of claim 15,
where the campaign information indicates that a previous campaign is to be replaced by the toll-free data service campaign;
where the method further comprises:
  determining that the previous campaign is marked as ready to deploy; and
  replacing previous campaign information, associated with the previous campaign, with the campaign information for deploying the toll-free data service campaign based on determining that the previous campaign is marked as ready to deploy, and
where deploying the toll-free data service campaign further comprises:
  deploying the toll-free data service campaign based on replacing the previous campaign information with the campaign information for deploying the toll-free data service campaign.

17. The method of claim 15,
where the campaign information indicates that a previous campaign is to be replaced by the toll-free data service campaign,
where the method further comprises:
  determining that the previous campaign is marked as being deployed;
  preventing the toll-free data service campaign from being deployed while the previous campaign is marked as being deployed; and
  determining that deployment of the previous campaign has been completed, and
where deploying the toll-free data service campaign comprises:
  deploying the toll-free data service campaign based on determining that deployment of the previous campaign has been completed.

18. The method of claim 15,
where the campaign information indicates that there are no previous campaigns to be replaced by the toll-free data service campaign,
where the method further comprises:
  determining that there are no previous campaigns associated with the toll-free data service campaign based on the campaign information, and
where deploying the toll-free data service campaign comprises:
  deploying the toll-free data service campaign based on determining that there are no previous campaigns associated with the toll-free data service campaign.

19. The method of claim 15, where determining that deployment of the toll-free data service campaign has been completed comprises:
  determining that the toll-free data service campaign has been successfully deployed on the one or more enforcement devices; and
  determining that deployment of the toll-free data service campaign has been completed based on determining that the toll-free data service campaign has been successfully deployed on the one or more enforcement devices.

20. The method of claim 15, further comprising:
receiving updated campaign information, for an updated campaign, to replace the campaign information associated with the toll-free data service campaign;
determining that the toll-free data service campaign is marked as deployed based on marking the toll-free data service campaign as deployed; and
deploying the updated campaign based on determining that the toll-free data service campaign is marked as deployed.

\* \* \* \* \*